US011904458B2

(12) United States Patent
Carithers et al.

(10) Patent No.: US 11,904,458 B2
(45) Date of Patent: Feb. 20, 2024

(54) END EFFECTOR FOR MOBILE ROBOT CONFIGURED FOR TOOL CHANGEOUT AND BREAKAWAY

(71) Applicant: IAM ROBOTICS, LLC, Pittsburgh, PA (US)

(72) Inventors: Kyle Carithers, Wexford, PA (US); Jason Geist, Sarver, PA (US); Vladimir Altman, Pittsburgh, PA (US); Thomas Galluzzo, Gibsonia, PA (US)

(73) Assignee: Onward Robotics, Inc., Pittsburgh, PA (US)

( * ) Notice: Subject to any disclaimer, the term of this patent is extended or adjusted under 35 U.S.C. 154(b) by 377 days.

(21) Appl. No.: 17/196,831

(22) Filed: Mar. 9, 2021

(65) Prior Publication Data

US 2021/0276203 A1 Sep. 9, 2021

Related U.S. Application Data

(60) Provisional application No. 62/987,053, filed on Mar. 9, 2020.

(51) Int. Cl.
*B25J 15/06* (2006.01)
*B25J 15/04* (2006.01)
*B25J 19/02* (2006.01)

(52) U.S. Cl.
CPC ......... *B25J 15/0441* (2013.01); *B25J 15/045* (2013.01); *B25J 15/065* (2013.01); *B25J 15/0608* (2013.01); *B25J 19/023* (2013.01)

(58) Field of Classification Search
CPC .... B25J 15/065; B25J 15/0608; B25J 15/045; B25J 15/0441
See application file for complete search history.

(56) References Cited

U.S. PATENT DOCUMENTS 11,584,024 B2 * 2/2023 Kieffer ................ B25J 15/0061
2020/0017317 A1 * 1/2020 Yap ..................... B25J 15/0608

* cited by examiner

*Primary Examiner* — Randell J Krug
(74) *Attorney, Agent, or Firm* — Dentons Cohen & Grigsby P.C.

(57) ABSTRACT

High precision end effectors for robots and adapters that provide attachment of the end effectors to a variety of robotic arms are disclosed. The combination provides for harmless break-away of the end effector on collision, and autonomous tool changer capability for mobile robots.

29 Claims, 16 Drawing Sheets

END EFFECTOR FOR MOBILE ROBOT CONFIGURED FOR TOOL CHANGEOUT AND BREAKAWAY

CROSS-REFERENCE TO RELATED APPLICATIONS

The present application claims the benefit under 35 U.S.C. § 119(e) of prior U.S. Provisional Application Ser. No. 62/987,053, filed on Mar. 9, 2020, the entire content of which is incorporated by reference herein.

TECHNICAL FIELD

This invention relates in general to high precision end effectors for robots and in particular to a combination break-away and tool changer high-precision end effector for mobile manipulation robots.

BACKGROUND

Warehousing employers are facing increasing pressures on cost and delivery time from the exploding e-commerce industry. This comes at a time when many companies are facing a national labor shortage of workers to fill these warehouse jobs. For employees, these changes are demanding increased pick rates and hours. Additionally, many in the warehouse workforce spend up to 90% of their time just walking from one item to the next. The result is unhappy employees with turnover rates harmful to business. The employees that stay typically experience high rates of work-related injuries from lifting and repetitive motions.

Currently, warehouse or retail facilities follow a standard process for put-away and picking of goods. Items arrive into the facility at a receiving area, typically in cases or pallets, and are registered into an Inventory Management System (IMS) or Warehouse Management System (WMS). The IMS or WMS is a software database that stores information about the items, such as size, weight, inventory count, storage location, etc. After the items are received into the warehouse or retail facility, they are put-away into their storage locations, generally open shelving or racks. This is usually a manual process that involves a stock worker physically moving the items to a location and transferring the items onto the shelf or rack.

Picking an item in the warehouse is done by a manual pick worker, also called selector or picker, or can be done by either a pick worker or by the customer in a retail facility. When an order for items is received and registered with the WMS, a work order is created, commonly known as a pick list. The pick list instructs the picker about the items to be retrieved, i.e., identities, quantities, and locations within the facility. The picker then finds the items and physically transfers them to a shipping container associated with the order.

The time consuming and very manual nature of piece-picking and put-away makes it a costly process and, therefore, one that has led to intense scrutiny by organizations looking to save time and money. There are many solutions for both optimizing and automating various aspects of piece-picking and put-away. Such solutions range from augmenting manual labor with various technologies to completely replacing labor with customized picking equipment and infrastructure. For example, some automation systems support manual pick workers with autonomous mobile robots (AMR) that enable them to more rapidly locate and identify a product. Others, such as large-scale goods-to-person automated storage and retrieval systems (AS/RS) allow a pick worker to remain in a fixed location. These systems have movable SKU storage bins that can be carried by a machine to and from a fixed storage location and delivered to a worker for picking individual pieces out of the bins. There are also automated guided vehicle (AGV) systems that can transfer entire storage racks to and from a pick area where a worker can locate and grab the requested item.

The automation equipment technologies presently available for robotic picking operations generally require a substantial modification of infrastructure for the warehouse or distribution center in which they are used. This requires a significant up-front investment from the facility, which may be difficult to afford and is the main reason such solutions have not been widely adopted. As such, many distribution facilities still rely on manual labor to accomplish piece-picking. Further, current automation systems are generally not viable for retail centers because the infrastructure must also be accessible to the customer. That is, most current automation equipment cannot be used within a retail facility which relies on simple static shelving for product storage and display.

With the recent developments of autonomous mobile manipulation robots (AMMRs), autonomous picking for order fulfillment applications in warehouses and distributions centers is now a viable solution. The end effectors attached to these robot's arms are critical to successful picking of items from warehouse shelving. To date, none of these technologies have proven to be as adaptable as a human pick worker. For example, a human pick worker may pick a small item from the back of one shelf and a large crate of heavy items from another all within the same picking trip. While end effectors on these AMMRs can be changed out, none of the current automation equipment is flexible enough to accommodate changes to inventory or the operation process without human intervention.

Moreover, the prior art tool changing and collision detection capabilities generally utilize complex, precision mechanical devices that depend on positive air pressure. As such, these end effectors generally suffer from several additional problems, including (1) missed or failed picks due to calibration issues after an end effector hits an object, (2) long robot downtime after an end effector collides with an object, (3) safety issues caused by falling objects after a collision, and (4) difficulty in changing out end effector tools for different picking tasks.

SUMMARY

The presently disclosed invention overcomes many of the shortcomings of the prior art by providing a novel magnetic break-away mechanism that does not require positive pressure. The end effector and connection means of the present invention improves upon the prior art by combining multiple functions into a single interface which reduces complexity, mass, and cost while significantly reducing end effector volume that must be allocated to tool changing and collision avoidance.

Accordingly, the presently disclosed invention relates to a magnetic break-away and tool changer mechanism for an autonomous mobile manipulation robot (AMMR). The system generally comprises an adapter and an end effector. The adapter includes a pneumatic fitting, a top surface configured for connection to an end of a robotic arm, and a bottom surface including a port in fluid communication with the pneumatic fitting, an adapter magnetic connector, and an adapter electrical connector. The end effector comprises a body having a distal end including a picker, and a proximal end configured for a releasable break-away connection with the bottom surface of the adapter, the connection including a quick disconnect fitting configured for connection with the port of the adapter, an end effector magnetic connector, and an end effector electrical connector. The adapter magnetic and electrical connectors are configured for connection with the end effector magnetic and electrical connectors, respectively, to provide the releasable break-away connection between the adapter and the end effector.

The top surface of the adapter may comprise at least one robotic arm alignment feature and at least one attachment fixture.

The at least one robotic arm alignment feature may be adapted to engage an aperture at a distal end of a robotic arm, and the at least one attachment fixture may provide attachment of the adapter to the distal end of the robotic arm. For example, the at least one attachment fixture of the adapter may comprise at least one mounting screw.

The adapter magnetic connector may comprise a ferromagnetic plate or at least one magnet, and the end effector magnetic connector may comprise the other of the at least one magnet and the ferromagnetic plate, or both the adapter magnetic connector and the end effector magnetic connector may comprise at least one magnet and a ferromagnetic plate.

The adapter electrical connector may comprise at least one contact pin target or at least one contact pin, and the end effector electrical connector may comprise the other of the at least one contact pin target or the at least one contact pin.

The proximal end of the end effector and the bottom surface of the adapter may comprise alignment features that engage upon connection between the end effector and the adapter. For example, the alignment features may include an alignment ring on the end effector that engages with spring plungers on the adapter. The alignment features may further include one or more diamond pins on the end effector that engage with aligned slots on the adapter.

The proximal end of the end effector may comprise clocking features that provide initial alignment of the end effector with the bottom surface of the adapter.

The end effector may comprise a variety of sensor. For example, the end effector may comprise a first sensor set and a second sensor set, wherein the first and second sensor sets are centrally located on the end effector on opposing sides thereof. Exemplary first and second sensor sets comprise a 3D camera and a light. The end effector may comprise at least one strain gauge configured to register either or both of a collision and a weight of a picked item.

The end effector may comprise a conduit providing fluid communication between the pneumatic fitting and the picker when the releasable break-away connection between the adapter and the end effector is engaged.

The end effector may comprise an extension tool positioned between the picker and the distal end of the end effector, wherein the extension tool comprises a reduced diameter portion of the end effector at the distal end thereof. The reduced diameter portion may be offset from a central longitudinal axis of the end effector. Moreover, the end effector may comprise a one-piece chassis, wherein the extension tool is a reduced diameter portion at a distal end thereof.

The end effector may be manually or autonomously engaged or disengaged from the adapter.

The presently disclosed invention also relates to an autonomous mobile manipulation robot (AMMR) comprising the magnetic break-away and tool changer mechanism described herein, wherein the top surface of the adapter is attached to a distal end of a robotic arm of the AMMR. The AMMR may be configured to autonomously exchange a first end effector for a second end effector.

The presently disclosed invention also relates to a method for accurate order fulfillment using the AMMR and magnetic break-away and tool changer mechanism described herein. The method generally includes picking at least one item or tote from an item storage location within the logistics facility using the end effector of the autonomous mobile manipulation robot (AMMR), wherein the AMMR can autonomously navigate and position itself within the logistics facility; placing the at least one item or tote on a piece containment area of the AMMR; and transferring, using the end effector, the at least one item or tote from the piece containment area of the AMMR to any of an autonomous mobile robot (AMR), a pack and/or ship area, a storage location in a logistics facility, or a human pick worker.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized, and other changes may be made without departing from the spirit or scope of the subject matter presented herein.

DETAILED DESCRIPTION

Figure 1:
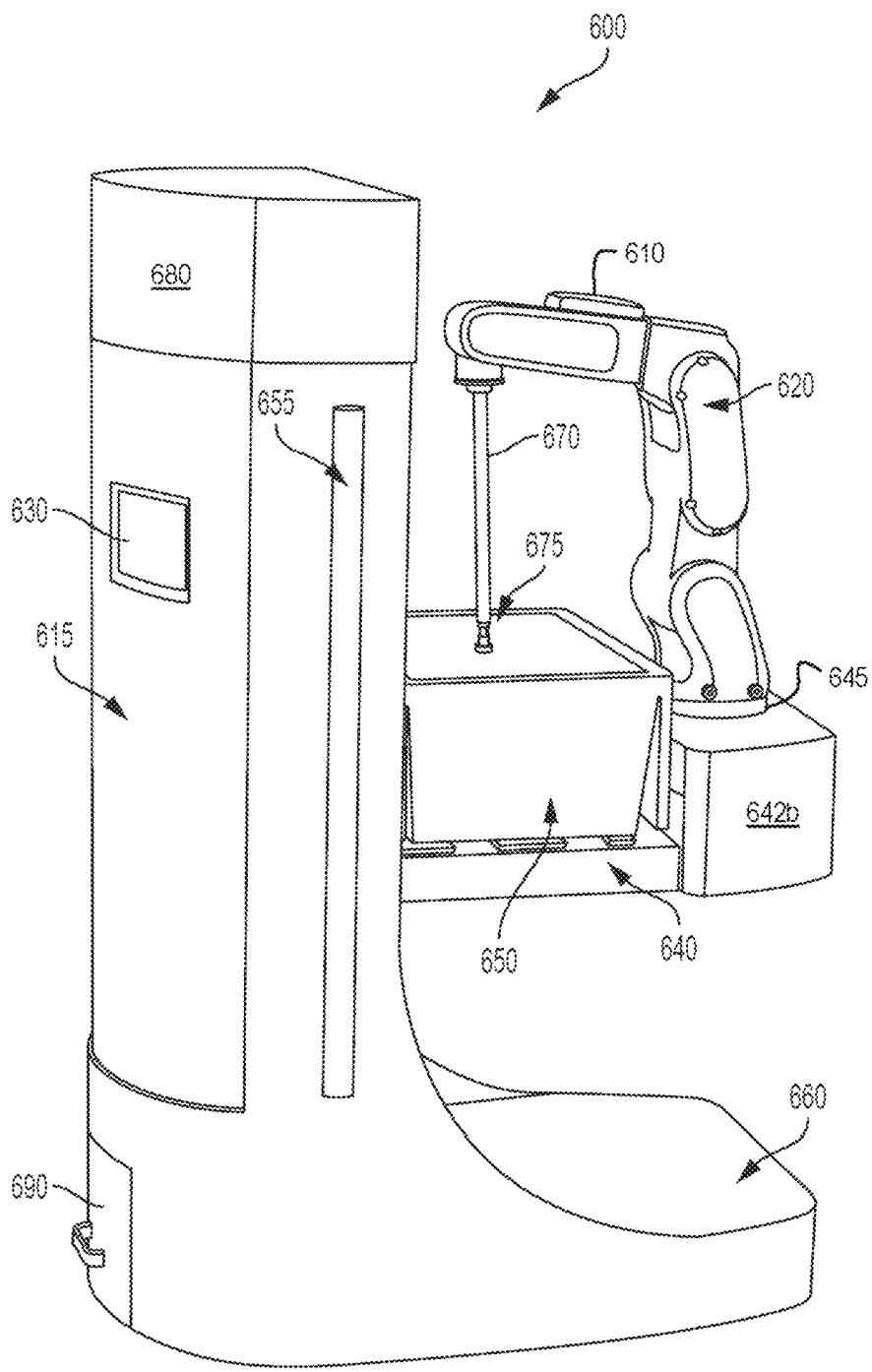
FIG. 1 illustrates a rear perspective view of an autonomous mobile manipulation robot in accordance with certain aspects of the presently disclosed invention.

In the following description, the present invention is related to a novel adapter and end effector design that allows for quick manual, robotic, or autonomous end effector changeout and break-away on a standard robotic arm. Devices and methods for end effector changeout and break-away are disclosed, as well as methods for piece-picking or put-away within a logistics facility using the novel adapter and end effector disclosed herein. The presently disclosed invention utilizes both robotics hardware and software technologies that are detailed in the following description.

The above summary and drawings are not intended to describe or show each illustrated embodiment or every possible implementation of the presently disclosed invention. Furthermore, various aspects of the systems and methods disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the system in addition to the orientation depicted in the drawings. By way of example, if aspects of the end effector or adapter shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

As defined herein, a Stock Keeping Unit (SKU) refers to a distinct item, and embodies attributes associated with the item that may distinguish it from another item. For a product, these attributes may include, but are not limited to, the product manufacturer, product description, material, size, shape, color, weight, and packaging. Further, an individual SKU may also have a code imprinted thereon which may indicate some of the same above attributes. Examples of such codes include at least color or black and white barcodes such as a Universal Product Code (UPC), International Article Number (EAN), and Global Trade Item Number (GTIN); QR codes; and ArUco codes.

The terms "goods", "products", and "items" are used interchangeably, and may be taken to indicate objects that need to be retrieved and/or stored. The terms "bin" and "tote" are also used interchangeably, and may be taken to mean a container used to store products or goods while they are located on a shelf within a logistics facility, or as they are moved throughout the logistics facility on a robotic system or conveyor belt.

The terms "storage" and "memory" may be used interchangeably and may be taken to indicate both transient and permanent storage (i.e., on a non-volatile memory hardware device) of data on a computer.

The term "logistics" facility may be taken to mean any facility that provides for the efficient production, storage, and/or flow of goods. Exemplary logistics facilities include at least warehouses, distribution centers, retail centers, or manufacturing facilities.

The term "warehouse management system" or WMS may be understood to mean any database which stores information about items or products stored within a logistics facility, and may include the product size, weight, inventory count, storage location, etc. The terms "warehouse execution system," or WES and "warehouse control system," or WCS may be understood to mean a software application that directs the real-time activities within logistics facility. The terms warehouse management system, WMS, warehouse execution system, WES, warehouse control system, or WCS are used interchangeably herein, and reference to one may comprise reference to any or all of these terms.

The presently disclosed invention is related to novel adapter and end effector designs that allow for quick manual, robotic, or autonomous end effector changeout and break-away on a robotic arm. The presently disclosed invention also relates to an adapter comprising a body with locating features, a pneumatic port, either or both of a ferromagnetic plate and magnets, and either of contact pin targets or contact pins. The presently disclosed invention further relates to an end effector comprising a body with locating features, a locating ring, a pneumatic port, the other of the ferromagnetic plate and/or magnets, and the other of the contact pin targets or the contact pins.

According to certain aspects, the adapter may be electrically and pneumatically connected to electronics and system air through the robotic arm or by a separate tether. When attached to a robotic arm, the adapter provides a combination of magnetic force and locating features that provide repeatable alignment, and pneumatic and electrical connections for the end effector.

According to certain aspects, the end effector may comprise a one-piece plastic chassis that provides accurate positioning of end effector tooling and sensor(s) by eliminating tolerance stack-ups that may occur with a multi-component body.

As discussed, the tool changing capability, as well as the collision detection and avoidance technology of prior art end effectors generally rely on complex, precision mechanical devices that utilize air pressure. In part due to the multi-component bodies of these devices, picking errors are common owing to calibration issues after an end effector hits an object. The presently disclosed invention addresses at least two causes of such calibration issues: a damaged (e.g., bent) end effector caused by a collision, and plastic "creep," which means plastic in the interface between the end effector and the arm had the tendency to sag as it was tensioned over time.

Other problems addressed by the presently disclosed invention include long robot downtime after an end effector collides with an object. Up to one hour of downtime is standard after a collision has occurred to manually replace a broken break-away interface or attach a new end effector and recalibrate the tool. Moreover, cables and tubing attached between the arm and the end effector could be strained or broken after a collision and break-away of the end effector, leading to additional downtime as these key components of the robot arm are repaired or replaced. Finally, the process to manually change out the end effector tool for different picking tasks is generally difficult and cumbersome.

The presently disclosed invention improves upon the prior art by combining multiple functions into a single interface which reduces complexity, mass, and cost while significantly reducing end effector volume that must be allocated to tool changing and collision avoidance functionalities. The novel design of the inventive adapter and end effector provides a system that allows the end effector to harmlessly break-away from a robotic arm upon collision with an object so that the end effector remains undamaged and safety is greatly enhanced. After break-away, the end effector can be quickly and easily placed back on the robotic arm, allowing the robot to start working again without the need for recalibration, providing for minimal downtime.

Further, the design improves repeatability and eliminates matched pairing. The unique design of the adapter allows a variety of end effectors to be attached to a variety of robotic arms. Thus, disclosed herein is an autonomous mobile manipulation robot (AMMR) having the novel adapter of the presently disclosed invention attached at a distal end of a robotic arm. End effectors as required by a specific picking task may then be quickly and easily attached to the adapter on the AMMR. Moreover, the AMMR may attach, detach, and exchange end effectors autonomously based on the requirements of the picking task.

Finally, safety is greatly enhanced as the invention nearly eliminates the chance for heavy objects (e.g., shelving) to fall when hit by the end effector. The end effector breaks away when hit on an angle, so the object hit is not damaged or disturbed, and the robot automatically stops. Moreover, a safety switch may detect strong pressure on forward motion (i.e., not at an angle), which may also cause the robot to automatically stop. Thus, collision avoidance may be achieved by the presently disclosed invention through use of a combination of sensors and a unique interface that is designed to break-away.

Referring now to the drawings, systems and methods for tool changing and magnetic break-away are shown and described with reference to FIGS. 1-21.

Figure 2:
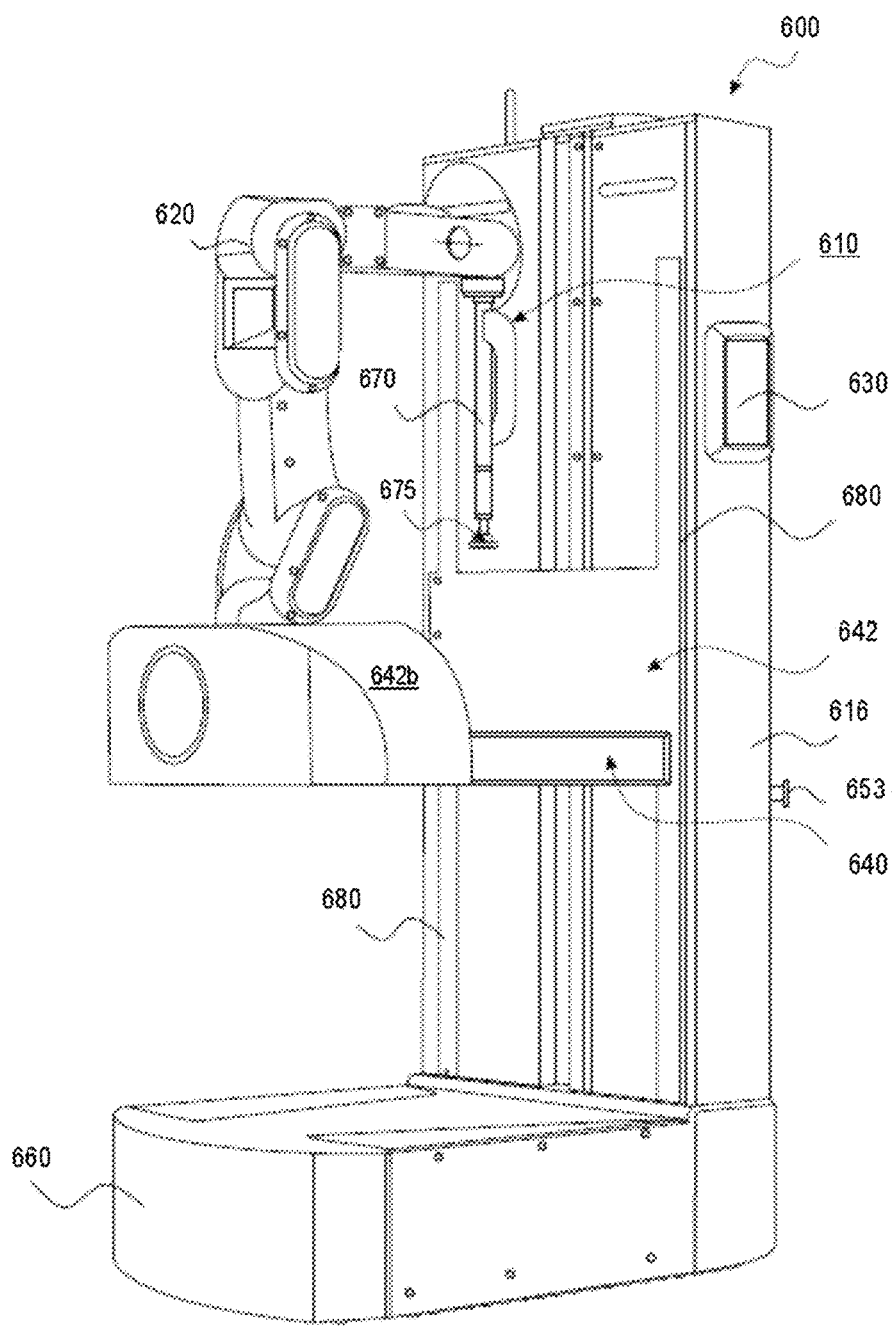
FIG. 2 illustrates a front perspective view of an autonomous mobile manipulation robot in accordance with certain aspects of the presently disclosed invention.

The unique end effector and adapters of the presently disclosed invention may be used in combination with an autonomous mobile manipulation robot (AMMR) to provide automated piece-picking and put-away in a variety of logistics facilities. With reference to FIGS. 1 and 2, the end effector 670 as attached to a distal end of a robotic arm 620 on an exemplary AMMR is shown. The end effector 670 may provide picking or put-away of individual items to/from a platform 640 on the AMMR 600, or to/from a bin or tote 650 held on the platform, or may provide picking or put-away of bins or totes 650 to/from the platform on the robot. The AMMR 600 may transport items, bins, or totes to a staging area (e.g., see 350 of FIG. 18), or to an autonomous mobile robot (AMR; 900 of FIG. 18 or 21) for lower cost, more efficient transport to a packing or staging area. AMRs do not include the robotic arm 620 found on AMMRs.

Figure 3:
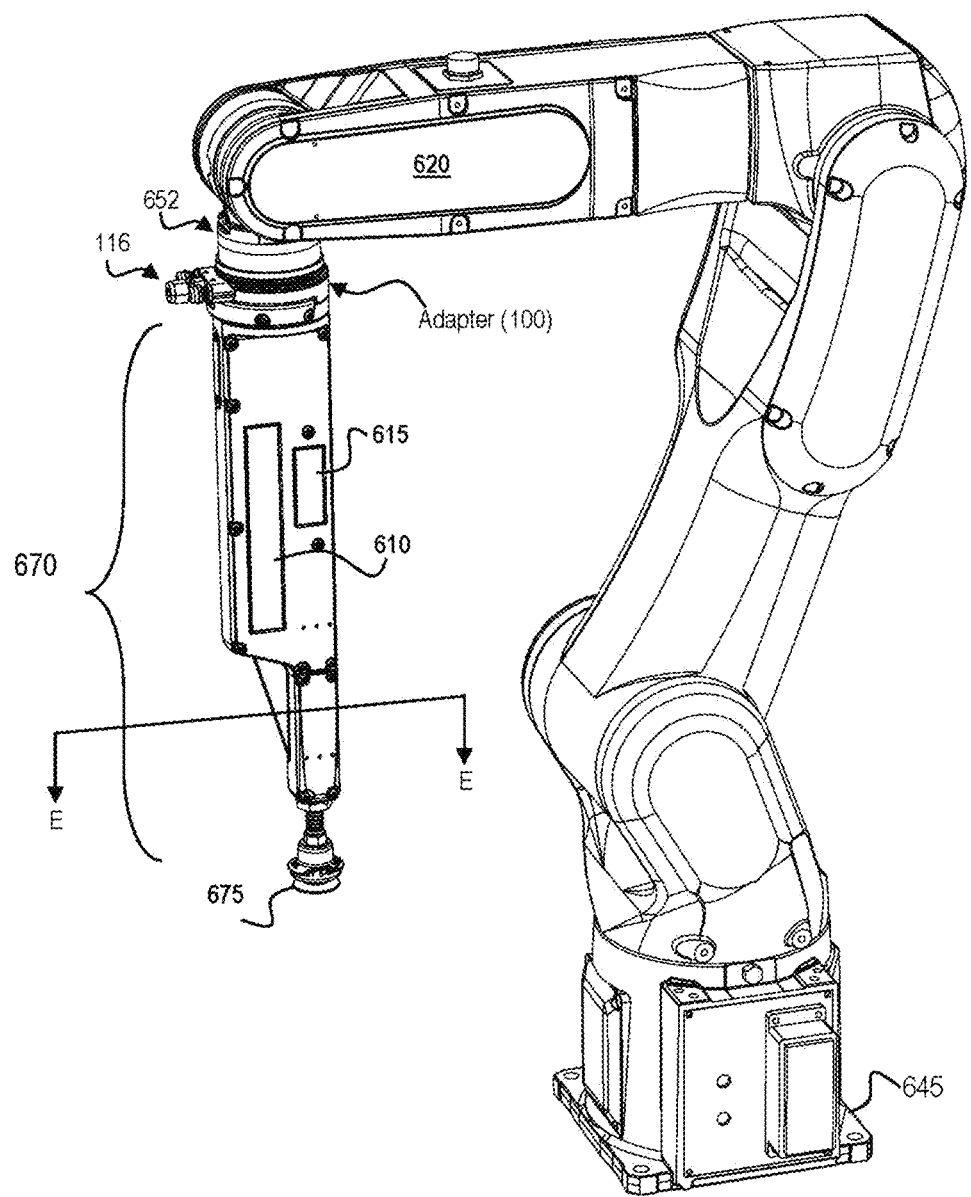
FIG. 3 illustrates a robotic arm including an adapter and end effector in accordance with certain aspects of the presently disclosed invention.

FIG. 3 shows an exemplary robotic arm 620 having a base 645 configured for attachment to an AMMR, such as the AMMR 600 shown in FIGS. 1 and 2. The robotic arm 620 may include multiple degrees of freedom, and a distal end 652 configured for attachment of an end effector 670. According to the presently disclosed invention, attachment of the end effector 670 to the robotic arm 620 is via an adapter 100. As such, a common interface on the end effector may be used for attachment to a wide range of robotic arms, wherein the adapter 100 provides specific contact and attachment to the varied interfaces of different robotic arms.

With continued reference to FIG. 3, the end effector 670 may include a task specific picker 675 positioned at a distal end, i.e., an end opposite from the attachment to the robotic arm 620. The picker 675 may be specific to a manipulation task, such as the suction cup shown in the figures. The picker 675 may be connected to a vacuum pump through an onboard computer processor 218 controlled valve so that vacuum suction at the suction cup may be engaged and disengaged by actuating the valve, thereby allowing the AMMR to grasp the desired pick item on contact and then release it when necessary. The use of a suction cup also allows the AMMR to grasp an item at a single point and orientation, which reduces the computation time required for the system to determine how to grasp the pick item.

Alternatively, the picker may be a mechanically actuated gripper such as, for example, a robotic hand having articulated digits. The picker may be a simple gripper, an electroadhesion picker, a magnetic picker, or combinations thereof. Exemplary magnetic pickers may utilize electromagnets, permanent magnets, or magnet arrays which provide opposing magnetic fields. An electroadhesive picker may use reversible electrostatic adhesion to grip an item while it is picked and put. When an electroadhesive or magnetic picker is used, such may be powered by an electrical power supply configured to generate an electrostatic or magnetic adhesive force that is used to releasably adhere the item to the picker. The onboard computer processor 218 (see FIG. 17) may control the power supply to activate and deactivate the electrostatic or magnetic adhesive force of the picker.

The decision to use of one, various interchanged, or a combination of picker technologies is driven by the physical properties of the objects to be grasped so that a sufficient amount of lift force is generated to carry the objects by the robotic arm without causing damage or visible alterations to the objects.

Figure 4:
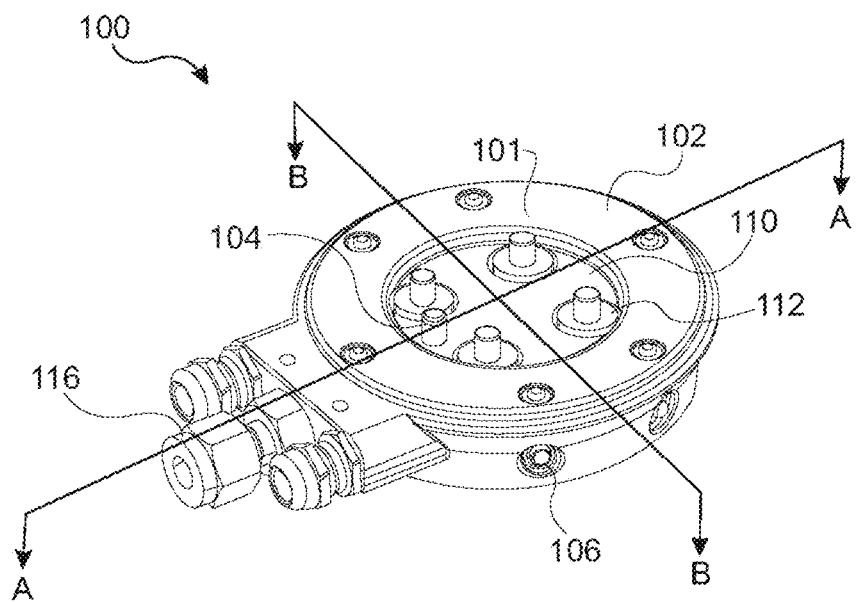
FIG. 4 illustrates a top perspective view of an adapter in accordance with certain aspects of the presently disclosed invention.
Figure 5:
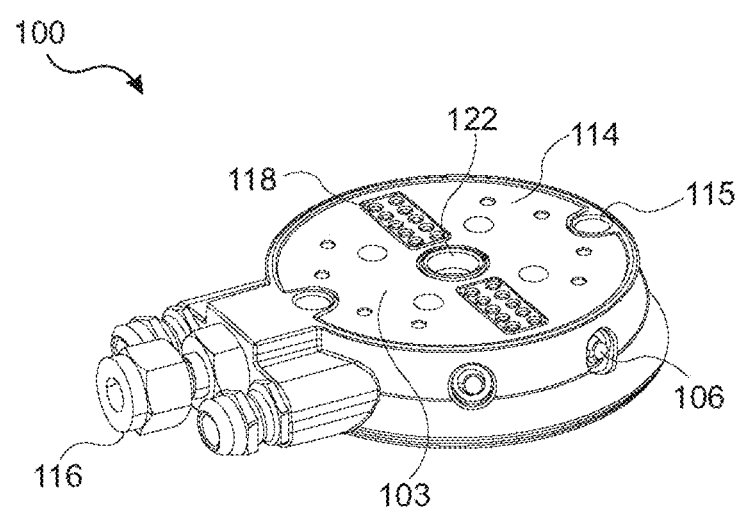
FIG. 5 illustrates a bottom perspective view of the adapter of FIG. 4.

The end effector 670 is releasably connected to the distal end of the robotic arm 620 via an adapter 100. With reference to FIGS. 4 and 5, the presently disclosed adapter 100 includes a top surface 101 configured for connection with the distal end 652 of the robotic arm 620, and an opposite bottom surface 103 configured for connection with an end effector 670. The adapter 100 may be attached to the robotic arm 620 via the top surface 101, which includes orienting and mounting features. As shown in FIG. 4, the orienting features may include at least one orienting pin 104 and/or a unique orienting surface such as the centrally located depression 110 and cover 102, wherein the orienting features are configured to interact with a specific robotic arm 620, such as a robotic arm produced and sold by Fanuc Corporation. Exemplary mounting features may include mounting screws 112.

As shown in FIG. 5, the adapter 100 includes a bottom surface 103 configured for attachment to the end effector 670. The bottom surface 103 may include a ferromagnetic plate 114 for releasable connection to magnets on the end effector 670 (i.e., an adapter magnetic connector), and pin targets 118 that provide connection to and transmission of electrical power, such as from the AMMR to the end effector 670 (an adapter electrical connector). Also shown in FIG. 5 are the pneumatic fittings 116 that may provide connection to system air and thus may provide negative air pressure for the picker 675.

Figure 9:
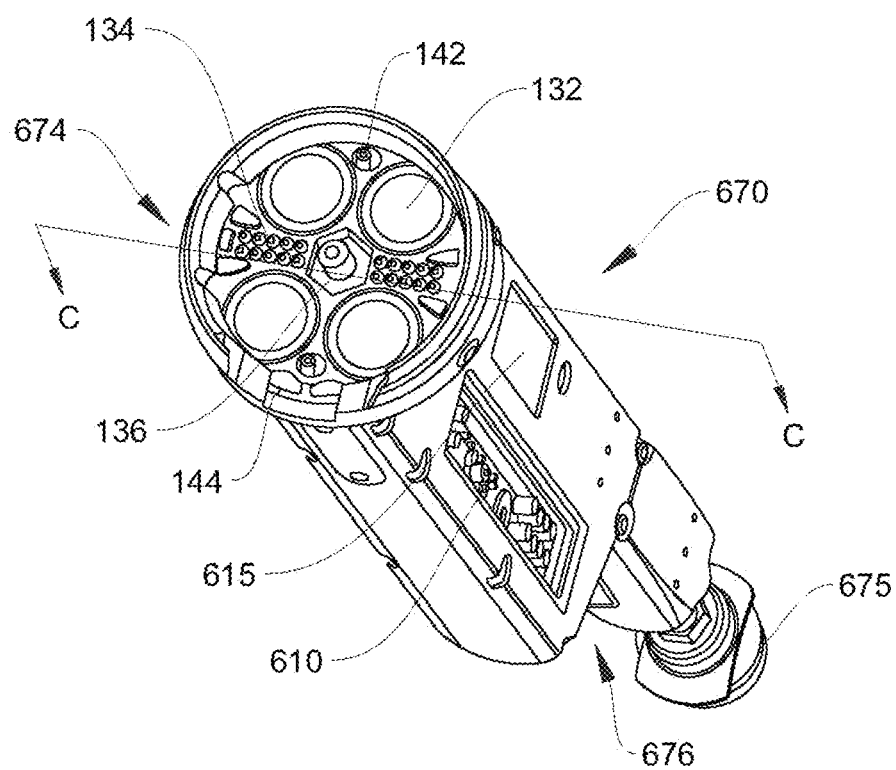
FIG. 9 illustrates a top perspective view of an end effector in accordance with certain aspects of the presently disclosed invention.

As shown in FIGS. 3 and 9, the end effector 670 generally comprises a body having the picker 675 positioned at a distal end 676 and a connection surface 674 at a proximal end. The connection surface 674 generally includes contact pins 134, such as spring-loaded contact pins (i.e., an end effector electrical connector), and one or more magnets 132 (i.e., an end effector magnetic connector), shown as four magnets positioned radially about a central quick-disconnect fitting 136. Also shown in FIGS. 3 and 9 are positions for a sensor 610, such as a 3D camera, and lighting, such as lighting bar 615, that may provide additional light to enhance sensor functionality (e.g., enhance images obtained by the sensor 610 when the sensor is a camera).

Figure 6:
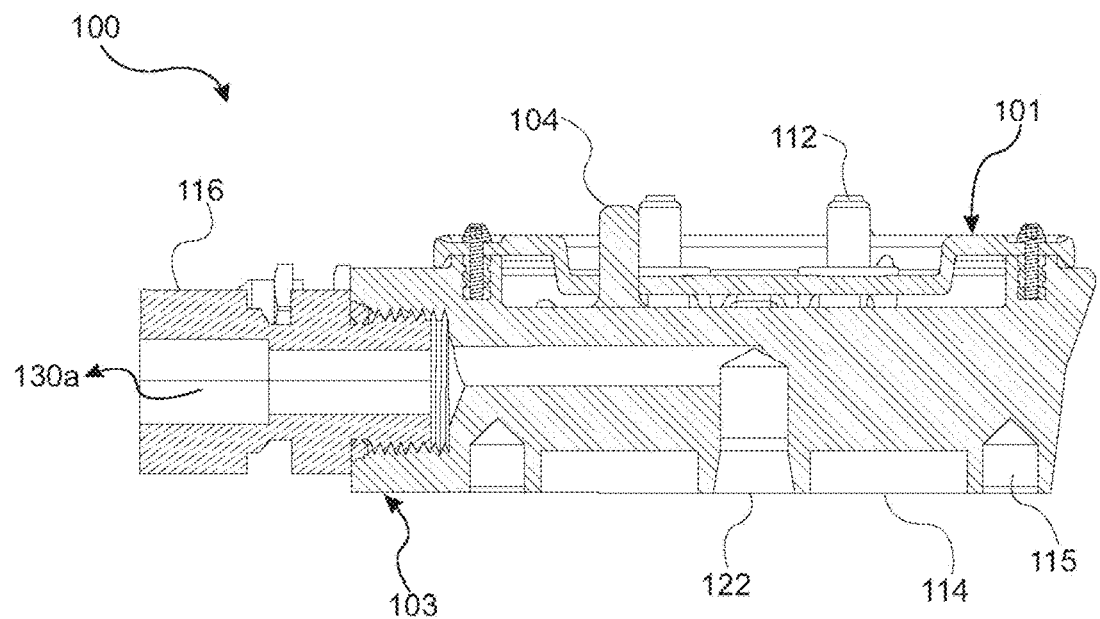
FIG. 6 illustrates cross-sectional view taken along line A-A of the adapter of FIG. 4.

With reference to FIG. 6, a cross-sectional view of the adapter 100 taken along line A-A of FIG. 4 shows the top surface 101, orienting pin 104, and mounting screws 112. Also shown is a port 122 on a bottom surface 103 of the adapter 100. The port 122 provides attachment of the quick-disconnect fitting 136 of the end effector 670 for pneumatic connection with system air (130a), such as through a pneumatic fitting 116. The port 122 is shown to be centrally located in the figures. This central location may allow for angular deflection during installation and/or break-away of the end effector, and in combination with controlled angular deflection limits, may prevent overstraining of the end effector fitting on the adapter. Also shown on the bottom surface of the adapter 100 is the ferromagnetic plate(s) 114.

Figure 7:
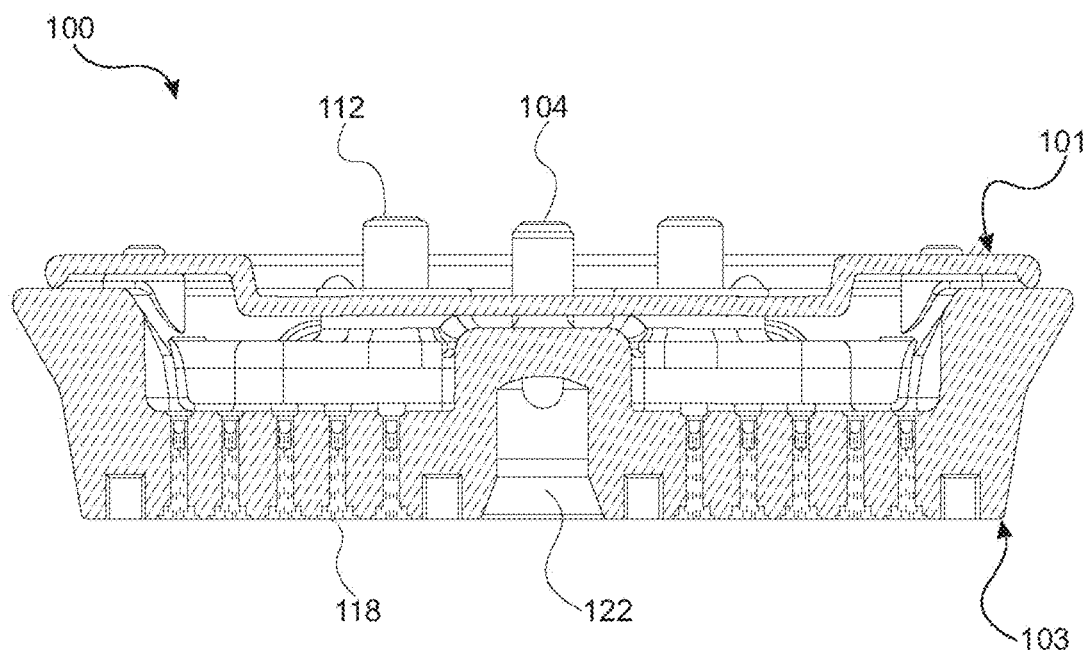
FIG. 7 illustrates cross-sectional view taken along line B-B of the adapter of FIG. 4.

FIG. 7 shows a cross-sectional view of the adapter 100 taken along line B-B of FIG. 4, i.e., a view rotated 90 degrees relative to the view shown in FIG. 6. The orienting pin 104 and mounting screws 112 are shown on the top surface 101, while the contact pin targets 118 and the port 122 are evident on the bottom surface 103. The contact pin targets 118 interface with the contact pins 134, such as spring-loaded contact pins on the end effector 670, to provide an electrical connection for power and/or data transmission between the AMMR and the end effector 670. According to certain aspects, the electrical connection of the adapter 100 to the AMMR may be through the robotic arm 620 or via a separate tether.

According to certain aspects, the adapter 100 may also be pneumatically connected to the AMMR through the robotic arm 620 or via a separate tether. For example, the adapter 100 may be pneumatically connected to system air, such as through a pneumatic fitting 116. This connection may then be passed to the end effector 670 via connection of a quick disconnect fitting 136 to the port 122 (see FIGS. 8 and 10).

While a specific arrangement of connections is shown on the adapter and/or end effector in the figures, other arrangements are possible and within the scope of the presently disclosed invention. For example, the contact pin targets 118 are shown to be located on the adapter 100 and the contact pins 134 are shown to be located on the end effector 670, an opposite arrangement is possible. That is, the contact pin targets 118 could be located on the end effector 670 and the contact pins 134 could be located on the adapter 100. As another example, the relative positions of the ferromagnetic plate 114 and the magnets 132 could be switch so that the adapter comprises the magnets 132 on a bottom surface 103 and the end effector comprises the ferromagnetic plate 114.

According to certain aspects, the magnetic break-away connection between the adapter 100 and the end effector 670 may be provided by matched sets of magnets rather than a single set of magnets and a ferromagnetic plate. That is, each of the adapter 100 and the end effector 670 may include at least one magnet configured to provide the magnetic break-away connection therebetween, i.e., the magnets may be alternately magnetized on the end surfaces, or when more than one magnet is included, the magnets may be alternately magnetized on either or both end surfaces for connection therebetween. Moreover, the magnets may be electromagnets that may be magnetized/demagnetized electrically, such as by the AMMR on tool changeout (i.e., changeout if the end effector). As such, some or all of the magnets may be connected to electrical power from the AMMR via the robotic arm of the AMMR, either shared with or separate from the electrical connection described between the adapter electrical connector and the end effector electrical connector.

Figure 8:
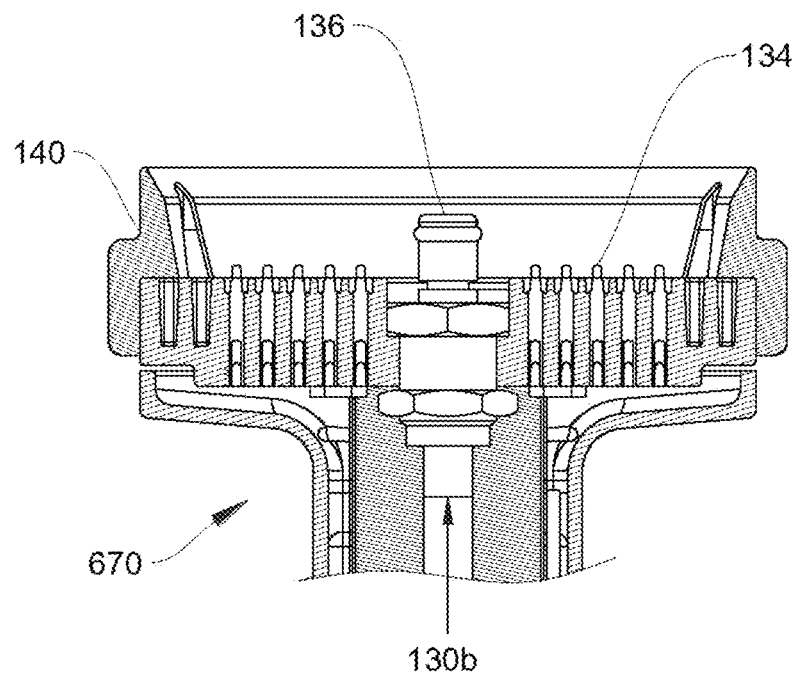
FIG. 8 illustrates a cross-sectional view taken along line C-C of a quick disconnect fitting, contact pins, and locating ring of the end effector of FIG. 9.

The features of the end effector which interface with the adapter are shown in FIGS. 8 and 9. With specific reference to FIG. 8, which shows a cross-sectional view of the end effector taken along line C-C of FIG. 9, a quick disconnect fitting 136 that interfaces with the port 122 of the adapter to provide pneumatic connection with system air of an AMMR is shown. Also shown are the contact pins 134 of the end effector 670, such as spring-loaded contact pins, that may be inserted into the contact pin targets 118 of the adapter 100 to provide electrical connection with the AMMR for transmission of data and power.

With specific reference to FIG. 9, an exemplary configuration of the magnetic break-away connection is shown. For example, the magnets 132 in the end effector 670 that attract the ferromagnetic plate 114 of the adapter 100 to form a break-away connection therebetween are shown. While the magnets 132 are shown as 4 discrete magnets, which in concert assist in proper alignment of the end effector on the adapter, other numbers and arrangements of magnets is within the scope of the present invention. For example, the magnets could be provided as two rectangular shaped magnets on either side of the contact pins 134.

Also shown in FIG. 9 are the contact pins 134 that interact with the contact pin targets 118 to provide electrical communication between the AMMR 600 and the end effector 670. A locating ring 140 is included to assist in achieving proper orientation of the end effector on the adapter, and to protect the contact pins 134 and the quick disconnect fitting 136 from mechanical damage. As shown, exemplary contact pin targets 118 may be recessed. However, other configurations for the contact pin targets, such as not recessed, are within the scope of the present invention.

Figure 10:
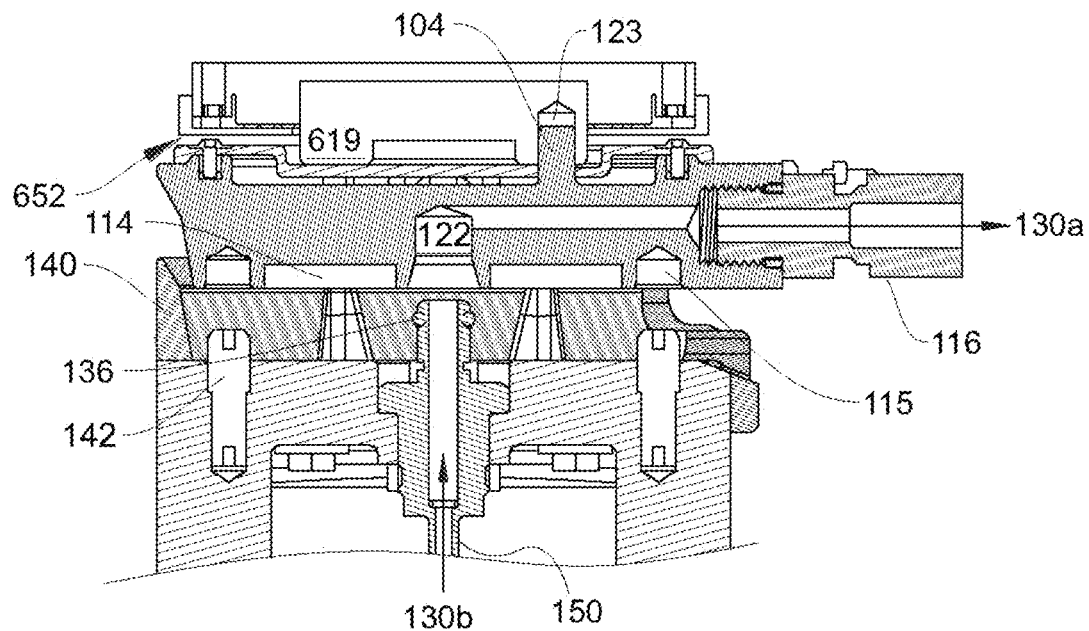
FIG. 10 illustrates a cross-sectional view taken along line D-D of the adapter connecting the end effector to the robotic arm as shown in FIG. 11.
Figure 11:
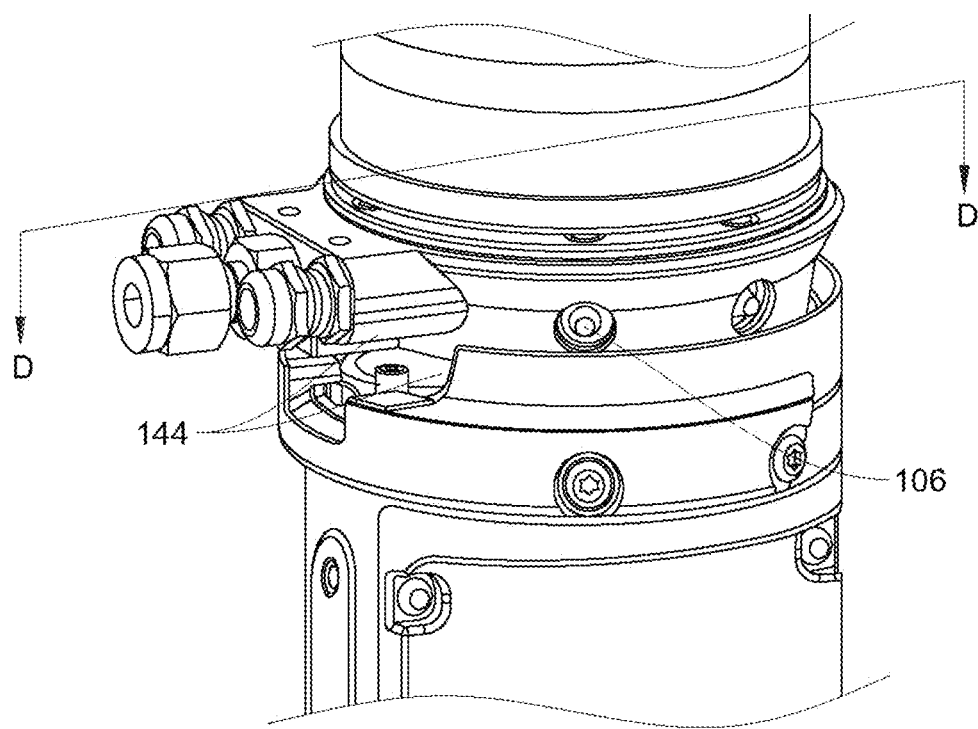
FIG. 11 illustrates a close-up view of an adapter connecting an end effector and robotic arm in accordance with certain aspects of the presently disclosed invention.
Figure 12:
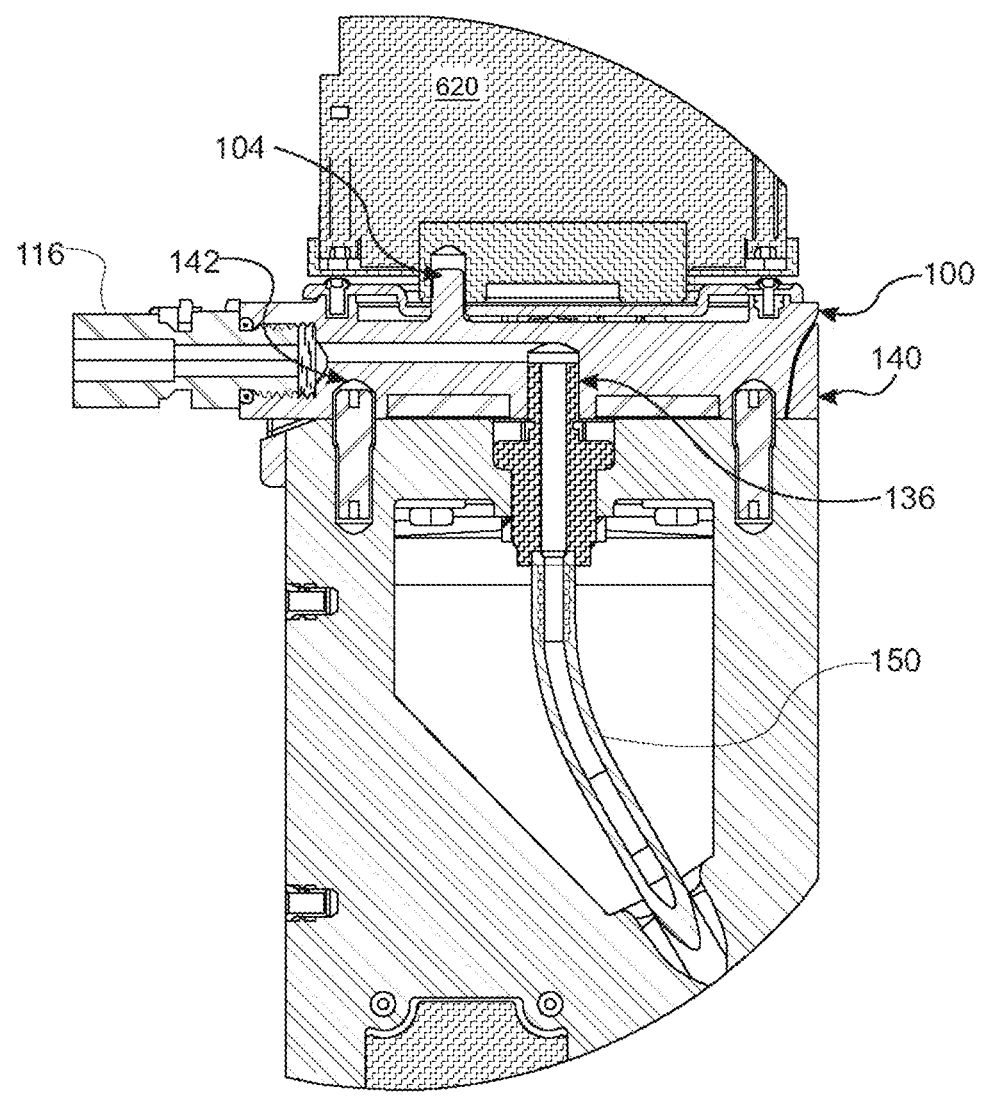
FIG. 12 illustrates another cross-sectional view taken along line D-D of the adapter connecting the end effector to the robotic arm as shown in FIG. 11, highlighting the path of the pneumatic tube of the end effector.

FIGS. 10, 11, and 12 show the mechanical engagement features of the adapter 100 and end effector 670. FIGS. 10 and 11 show cross-sectional views of the end effector 670 engaged with an adapter 100 that is connected to a distal end 652 of a robotic arm 620. The engagement of the end effector 670 with the adapter 100 may be manual or autonomous, and generally relies on several features to achieve proper orientation and connection between the two.

First, the operator or the AMMR initiates engagement by positioning the end effector 670 in close proximity to the adapter 100, i.e., to an adapter 100 attached to a distal end 652 of the robotic arm 620.

A magnetic attraction between the magnets 132 and the ferromagnetic plate 114 pulls the end effector 670 into the adapter 100, after which rotational clocking features 144 loosely orient the end effector 100. That is, the initial orientation of the connection between the end effector 670 and the adapter 100 may be controlled by rotationally asymmetric features in the adapter 100 and a locating ring 140. As the locating ring 140 engages to the adapter 100, spring plungers 106 along the outer conical surface center the end effector 670 axially to the adapter 100. The ferromagnetic plate 114 may be slightly recessed for consistent alignment and break-away force. Force on the end effector 670 causes a pivot along the locating ring 140.

While the ferromagnetic plate 114 is shown as recessed, other configurations are within the scope of the present invention. Recessing the ferromagnetic plate 114 prevents the plate from entering into the alignment stack and reduces the magnetic break-away force. A recessed configuration for the ferromagnetic plate 114 increases the separation between the magnet and the plate. This separation may be adjusted to move the force magnitude to a more stable part of the pull force curve and may thus improve repeatability of the break-away (i.e., force).

After the end effector 670 and adapter 100 are loosely aligned, as described above, a pneumatic fitting 116 on the end effector 670 then locates to a port 122 on the adapter 100, such as a chamfered manifold port. This connection provides fluid connection (130b) between the picker 675 through the end effector 670 and adapter to system air (130a). Finally, diamond pins 142 precisely clock the end effector 670 on the adapter 100 upon insertion into slots 115 in the bottom surface of the adapter (i.e., provides a final theta alignment). A rubber seal on the pneumatic fitting 136 provides the final side-to-side alignment. A thin ring along the outer diameter of the adapter 100 may provide the final up-down and tilt alignment.

Break-away force is engineered to be high enough to pick objects without the end effector 670 breaking away from the robotic arm 620, but the force is low enough to break-away upon a collision. The necessary force is determined primarily by the magnet size, shape, and material; the distance between the magnets and the ferromagnetic plate; and the outer diameter of the contact ring.

Also shown in FIG. 10 is the alignment and connection of the orienting feature 104 and centrally located depression 110 of the adapter 100 into a corresponding slot 123 and raised feature 619, respectively, at the distal end 652 of the robotic arm 670.

Figure 13:
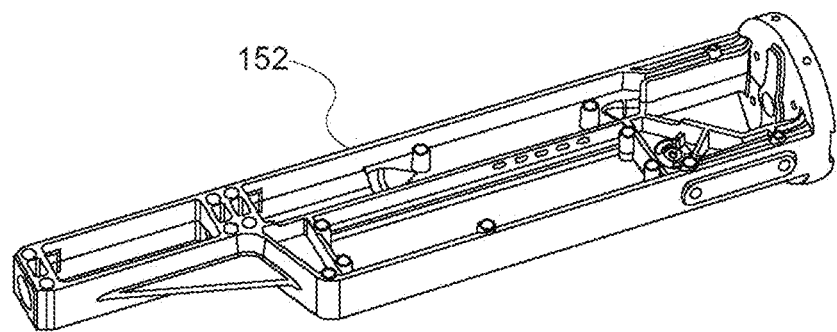
FIG. 13 illustrates a one-piece chassis design of an end effector in accordance with certain aspects of the presently disclosed invention.

The unique combination of magnetic force provided by the magnets 132, and the locating features provided by the diamond pins 142 and slots 115 generate repeatable end effector alignment, as well as pneumatic and electrical connection. Precision alignment is achieved with the presently disclosed adapter and end effector without the need for matched pairing, which is necessary for high volume production and support, and allows for tool changer functionality. Further, the design of the end effector as a one-piece chassis (i.e., end effector body 152), as shown in FIG. 13, provides accurate positioning of end effector tooling and sensor(s) by eliminating tolerance stackups that may occur with a multi-component body.

The novel adapter and end effector disclosed herein further provides collision avoidance using a combination of sensors and an interface designed to break-away. Moreover, the adapter acts as a universal connecter for the robotic arm and houses the tool changer and electrical/pneumatic interfaces as well as the ferromagnetic plate for magnetic break-away.

Figure 16:
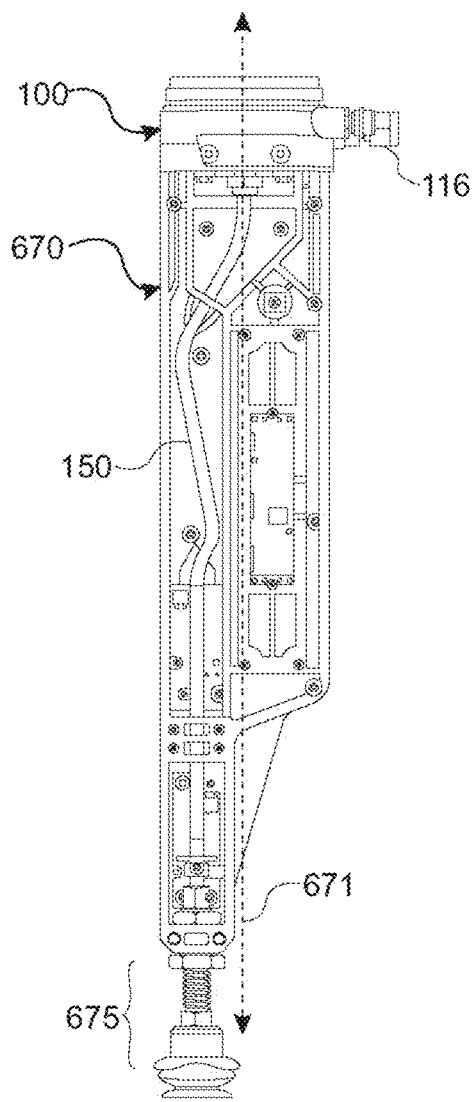
FIG. 16 illustrates a sectional view of an end effector having an adapter connecter thereon in accordance with certain aspects of the presently disclosed invention, highlighting the path of the pneumatic tube of the end effector.

With reference to FIGS. 12 and 16, the unique routing of the pneumatic tube 150 that connects with system air via the pneumatic fitting 116 to provide suction to the picker 675 is shown. With specific reference to FIG. 16, the S-shaped routing of the pneumatic tube 150 allows connection to and placement of the picker 675 offset from a longitudinal axis 671 of the end effector 670. This configuration further provides enough flexibility and space for movement of the pneumatic tube 150 within the end effector body 152 during level compensation operations.

Figure 14:
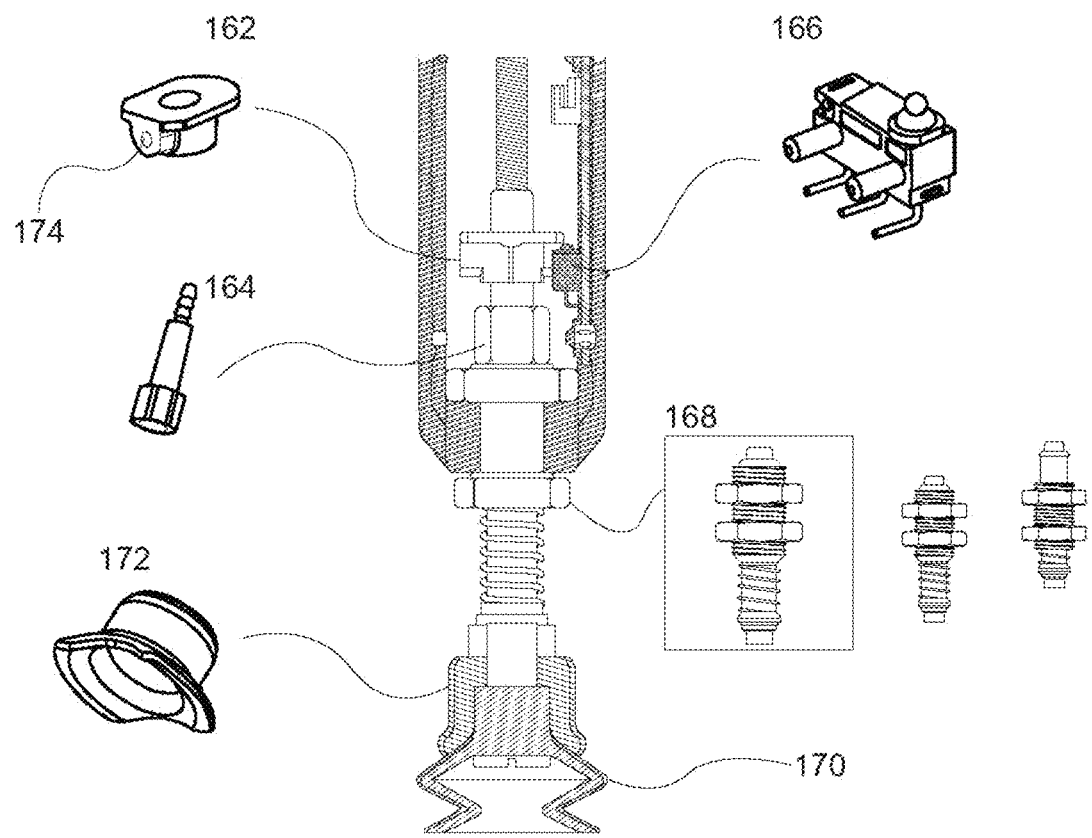
FIG. 14 illustrates a cross-sectional view taken along line E-E of a picker on the end effector of FIG. 3, wherein individual parts of the picker are shown in perspective views.
Figure 15:
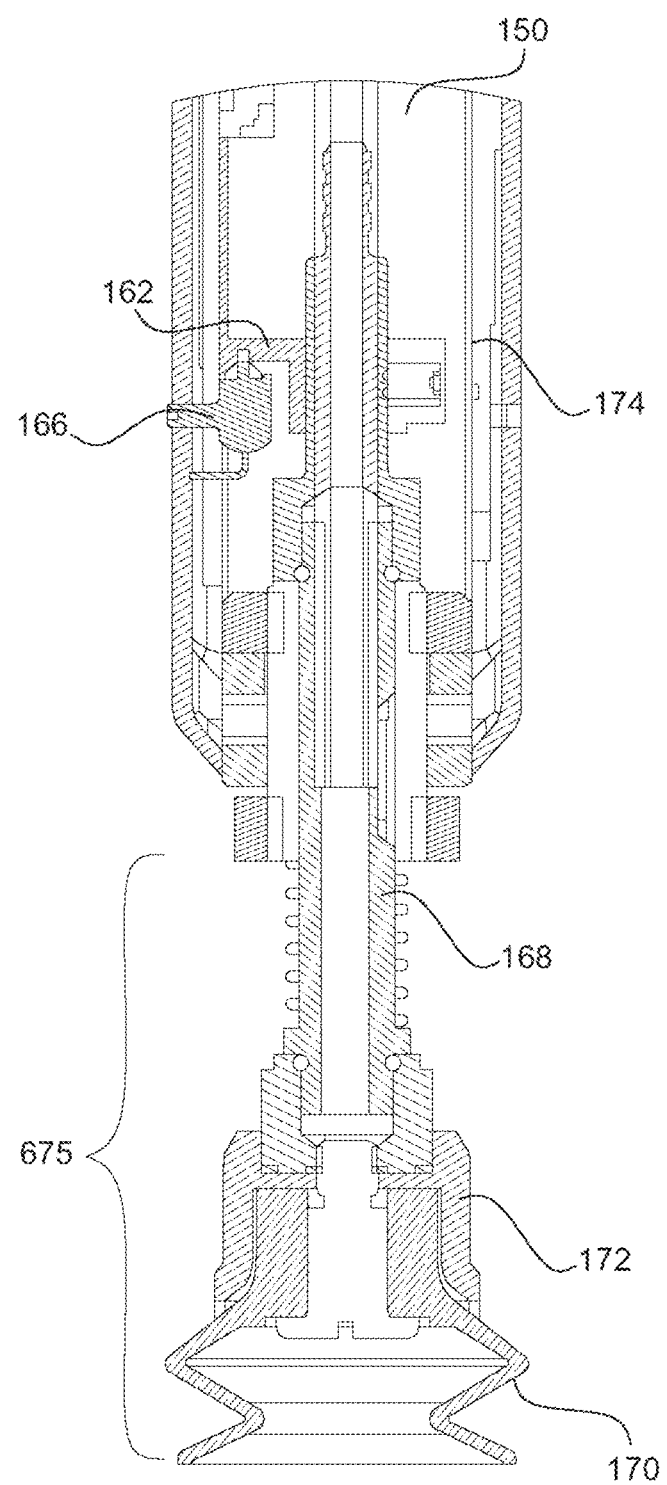
FIG. 15 illustrates a cross-sectional view taken along line E-E of a picker on the end effector of FIG. 3.

With reference to FIGS. 14 and 15, which are cross-sectional views taken along line E-E of FIG. 3, when the picker 675 is configured as a suction cup 170 as shown, it may comprise level compensating functionality that may further enhance successful picking and lifting of items on the vertical face of the item (i.e., the side of the item parallel to the gravity vector of the item). According to certain aspects, the picker 675 may comprise a switch 166 and a unique switch actuator collar 162 that may be positioned and attached on a fitting 164 by a set screw (e.g., such as a screw positioned in hole 174). An exemplary fitting 164 may include a cylindrical thread adapter, such as one used to connect the pneumatic tube 150 to a level compensator 168 positioned proximally from the suction cup 170 on the end effector 670. Upon compression of the suction cup 170 and thus the level compensator 168, such as by connection with an item to be picked, the actuator collar 162 will move away from the switch 166 and break the circuit formed therebetween. The open state of the detection switch signals to the system that a pick and/or a collision has occurred.

Strain gauges may be positioned on the adapter 100 or the end effector 670, such as along the end effector body 152, to monitor for forces on the end effector. Data may be evaluated by the AMMR processor 218 for levels that would indicate a pick and/or a collision has occurred.

According to certain aspects, the end effector may include a processor and memory, i.e. a microcontroller. Accordingly, information from the strain gauges and/or sensors may alternatively or additionally be received by the processor of the end effector and may be sent to the AMMR therefrom. For example, the microprocessor of the end effector may be configured to calculate a weight of an item picked by the picker 675 based on information from the strain gauges. This weight may be used by the AMMR to determine if a correct item has been picked based on comparison with a known weight for the item (i.e., information about the SKU from the WMS 201 or the central server 200). Moreover, if the weight registered by the end effector differs from a weight registered by another portion of the AMMR, such as a weight measured when the item is placed in the platform 640, the AMMR may register a fault state for the end effector.

If an end effector collision occurs, the end effector may break-away from the robotic arm. According to certain aspects, the end effector 670 may be connected to the robotic arm 620 by a flexible connector, such as a metal chain or cord, so that the end effector 670 will hang harmlessly after a break-away. Further, the contact pins 134 connecting the adapter 100 and the end effector 670 become open, i.e., disengaged from the contact pin targets 118, signaling to the system that the end effector has become disengaged. According to certain aspects, the system is a processor(s) 218 and storage 216 of the AMMR 600. The processor 218 may send signals to a central server 200 and/or WMS 201 indicating the end effector 670 is disengaged and may receive signals therefrom regarding remediation actions. Such actions may include moving to a specified location so that a human worker may reattach the end effector.

According to certain aspects, the AMMR may be configured to position the detached end effector 670 on an accessory of the AMMR body, such as a shelf, hook, or port, that may properly position the end effector 670 so that the AMMR may autonomously reattach the end effector 670. Exemplary positions include at least a front end of the vertical actuator stage 642, or a top or side portion of the main body 616 of the AMMR (see at FIG. 2). According to certain aspects, the end effector 670 may be connected to the robotic arm 620 by a flexible connector that may be actuated to an open or closed position by the robot. In such a case, after a break-away, such as induced by a collision, the end effector 670 will hang harmlessly from the robotic arm. The AMMR may be configured to position the detached end effector 670 on an accessory of the AMMR body, such as a shelf, hook, or port, or at any location within a facility provided for positioning of an end effector (i.e., shelf, hook, or port not on the AMMR), and may autonomously disengage the flexible connector. Upon positioning of a new end effector, the flexible connector may be autonomously engaged.

With continued reference to FIGS. 14 and 15, the picker 675 may further include a suction cup support 172 that surrounds and supports the suction cup 170. According to certain aspects, the suction cup support 172 may be rigid so that the suction cup 170 may pick items from a horizontal approach. Moreover, the suction cup support 172 may have a non-rotationally symmetric design, such as shown in FIG. 14. This design may expand the range of items that may be picked by allowing picking of closely spaced and/or narrow items. As shown, the suction cup support 172 has narrowed vertical sides, and thus a reduced horizontal profile so that it may not physically impact nearby items, while maintaining good support in a vertical direction when used for picking from a horizontal approach.

According to certain aspects of the presently disclosed invention, an extension tool may be provided at a distal end of the end effector 670, wherein the extension tool comprises a reduced diameter as compared to a diameter of the end effector. The reduced diameter extension tool may enable the AMMR 600 to position the picker 675 at a sufficient depth into a storage rack so that the end effector 670 may reach a desired item while maintaining clearance for the robotic arm 620 (i.e., so that the robotic arm does not come into contact with the infrastructure). It may also enable the picker 675 to reach into shelf corners where it would otherwise not have clearance for the robotic arm 620.

According to certain aspects, the extension tool may be sized based on specifics of the logistics facility such as, for example, shelf depth. That is, the extension tool may be long enough to reach into the back of a shelf, as mentioned above, so that the picker 675 may pick a piece placed therein. Furthermore, the reduced diameter of the extension tool may allow the extension tool to reach into a shelf without obstructing the view of the picker 675 and/or the piece to be picked, and may simplify the computation required to locate the piece as no additional sensor information may be required to locate the extension tool; information regarding the end effector 175 would be sufficient.

The unique design of the presently disclosed adapter 100 and end effector 670 provides a system that is a replaceable or switchable part of the robotic arm 620. In this way, logistics facilities having different configurations such as, for example, deeper shelving, may be accommodated by simply switching out the end effector 670 to one more suited for the work (e.g. a longer extension tool). Furthermore, in cases where different robotic arms 620 are used, an end effector 670 may require a different connection mechanism which may be accommodated by the adapter 100.

After items are picked, they may be placed into the platform 640 for transport (see FIGS. 1 and 2). The platform 640 may also carry a container, such as a bin or tote 650, in which the items can be placed. This method enables multiple items to be picked for a given order or batch of orders. This method frees the robotic arm 620 to pick additional pieces without needing to take multiple trips to and from an order transfer area (360 of FIG. 18). Additionally, by carrying a packing box or container or tote 650 onboard, the AMMR 600 is able to aggregate order pieces together into a single container that can be easily swapped with a different container for additional order fulfillment, such as by transferring the tote 650 to the transport platform of an AMR 900.

With reference to FIG. 9, the end effector comprises at least one sensor 610, which may be positioned at a central point thereon such that rotation of the robotic arm 620 directs the at least one sensor toward the item to be picked for identification and localization. According to certain aspects, at least one additional sensor may be positioned opposite the at least one sensor 610 on the end effector 670 such that once the robotic arm 620 angles itself to pick the item, the opposite sensor is now aimed directly into the platform 640 or transport tote 650 where the product is to be placed. This opposite sensor may provide the data necessary to allow an onboard computer processor 218 of the AMMR (see FIG. 18) to analyze the platform 640 or tote 650 to find the optimal location to place the item, considering that there might be previous objects already container thereon. Additionally, with two such sensors 610 aimed in opposite directions, the system may be able to pick from the left or the right side of the AMMR based on product location.

According to the presently disclosed invention, the platform 640 may comprise a calibration target which may be viewed by one or more of the sensors 610. The sensors 610 may be positioned to view the calibration target on the storage bed 640 when the robotic arm is rotated. As such, information on the calibration target may be used to calibrate these sensors 610 to ensure that all parameters are within specifications, and if not, update the parameters to reflect the current configuration. The dual use of the platform 640—as a platform to hold picked items and as a calibration target—reduces the size profile of the AMMR and improves the accuracy of the system.

The location of one or more sensors 610 on the end effector 670 allows for improved piece-picking accuracy. First, these sensors 610 will have an unobstructed and enlarged view of the items to be picked and their storage locations, which is improved over the view that is provided by sensors placed on the mobile base, as is the case in many prior art systems. Furthermore, sensors mounted on the mobile base may have their view of the items to be picked and their storage locations impeded by movement of the robotic arm.

Second, the one or more sensors 610 on the end effector 670 provide improved measurement accuracy of the item to be picked. The high degree of freedom robotic arm 620 may move and articulate at more than one point along the arm, and each movement introduces potential error to any measurements that may be made between the picker 675 and the items to be picked by sensors positioned on a mobile base 660 of the AMMR or on the robotic arm 620. Placement of the sensors 610 on the end effector 670 may reduce this error by bringing the sensors 610 closer to the items to be picked, and thus removing the error inherent in several points of articulation.

An exemplary AMMR 600 is shown in FIGS. 1 and 2, which illustrate rear and front perspective views, respectively. The AMMR 600 may have a wheeled mobile base 660, internal batteries 690, at least one platform 640 for picked items, and at least robotic arm 620. Exemplary configurations for the internal batteries 690 are shown in U.S. Patent Publication No. 2018/0104829, the entire contents of which are incorporated by reference herein.

Figure 17:
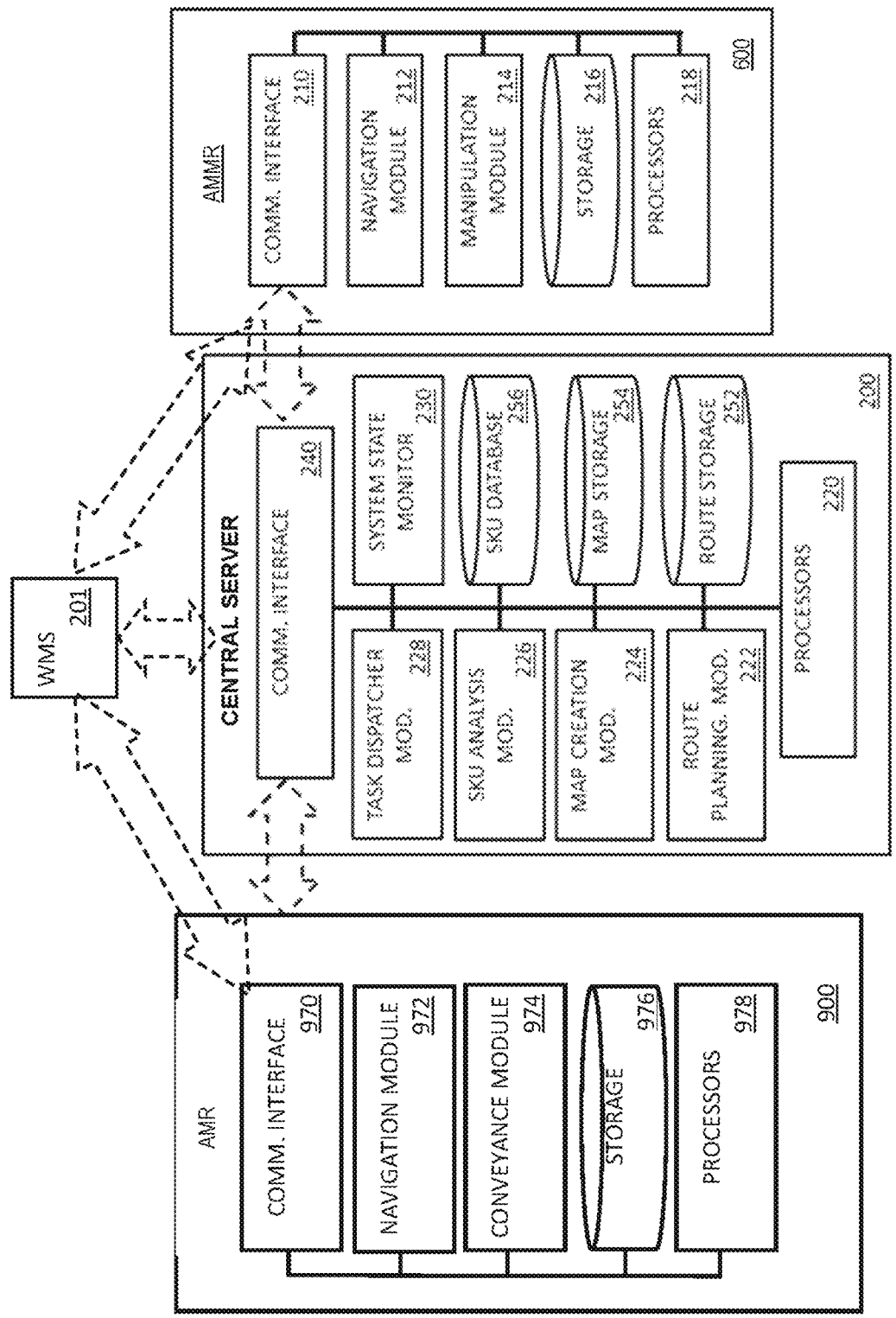
FIG. 17 illustrates a block diagram of a robotic system with hardware and software modules of a central server and a plurality of mobile manipulation robots in accordance with certain aspects of the presently disclosed invention.

With reference to FIG. 17, the AMMR 600 may include one or more onboard processors 218, an onboard storage or memory 216, and a remote communication interface 210 that allows communication with external servers (201, 240), the internet, and other similar or dissimilar robots (210). This communication may be established through a wireless network via a wireless access point.

The processor 218 may be configured to run a set of programs with algorithms capable of performing navigation and picking. Further, the onboard computer processor 218 utilizes data from sensors (610 and additional ground facing sensors) to output control signals to the mobile base 660 and robotic arm 620 for navigation and picking, respectively. The onboard computer processor 218 may also store specific information relevant to the configuration of each AMMR 600 in the local persistent memory 216. Such information may include sensor calibration data, actuator tuning parameters, and other platform specific data. The onboard computer processor 218 may also communicate with the central server 200 to receive pick order information and respond back with confirmation data to inform the central server 200 of successful picks or any errors that might occur.

As shown in FIG. 17, the AMMR 600 may be part of a system that includes additional robots 900, a central server 200, and/or a warehouse management system (WMS, 201). The other robots may include additional AMMR 600, or AMR 900. The system's central server 200 may be used to process order information that is transacted with a WMS 201 and may coordinate the fulfillment of orders with one or more AMMR 600 and optional AMR 900. All computation on the server 200 may be executed by one or more internal processors 220. The server may have two software modules that enable this order fulfillment coordination. The first processor may be a task dispatch module 228, which analyzes orders received from a WMS 201, and determines which of the AMMR 600 and/or AMR 900 is to be assigned to an order.

After one or more robots are selected for picking/transporting an order, the task dispatcher 228 instructs the robot 600/900 with high-level order picking information, such as, route navigation paths, SKU locations, and an order drop-off location. The task dispatcher 228 works closely with a system state monitor 230 to obtain key feedback information from the system. The system state monitor 230 may communicate with the robots 600/900 to keep track of their current physical location within the facility, along with status information, which may include but is not limited to: whether the robot is currently assigned an order, any faults or error modes, health information such as remaining battery power or charging status, inventory information, etc.

The central server 200 may also be used to store and process centralized SKU information in an SKU database 256, which stores information required by the robots to complete the order picking. The processing of this SKU specific information may be executed within a SKU analysis software module 226. The SKU information can include SKU size and shape data, which can include physical dimensions, 3D geometry that can include point and triangle mesh structures, item weight, appearance information that can include colorized texture maps, and may include SKU marking codes, that can include barcode and UPC data. Additionally, the central server 200 may store information in the SKU database 256 about the locations and regions on the surface of the individual SKU units that are allowed, or not allowed, for grasping by the AMMR 600. This allows the AMMR 600 to grasp an item in a way that is known to be safe and stable and prevents the robot from grasping an item at a point or in a way that is unsafe or unstable.

Each AMMR 600 may also have a user interface 630 which includes a graphical display monitor and an input device, where the input device may be a touch screen 630, a track ball, voice command, a keyboard, input buttons or any combination of these devices and possibly others. The user interface 630 allows a user to command and control each AMMR 600 to perform localized tasks and to enter product picking dispatch information manually, thus sending the robot on its mission. Such an interface may be used after a collision event to send information back to the central server 200 or WMS 201, or to provide commends to the AMMR 600.

Figure 20A:
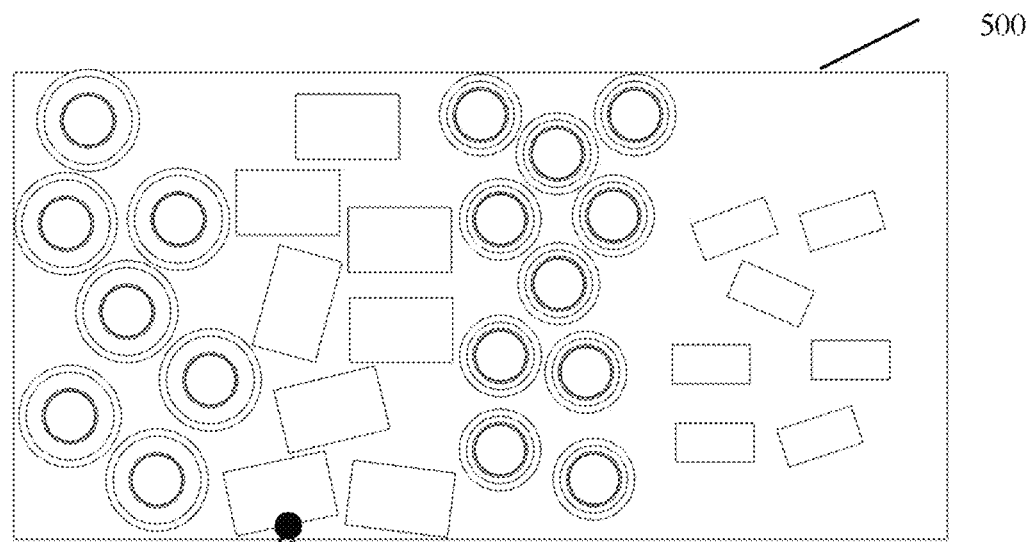
FIGS. 20A and 20B illustrate top and front views of a pick location with example pieces, grasp positions and vectors in accordance with certain aspects of the presently disclosed invention.
Figure 20B:
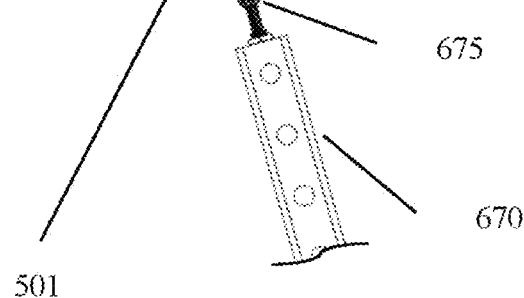
Figure 20B:
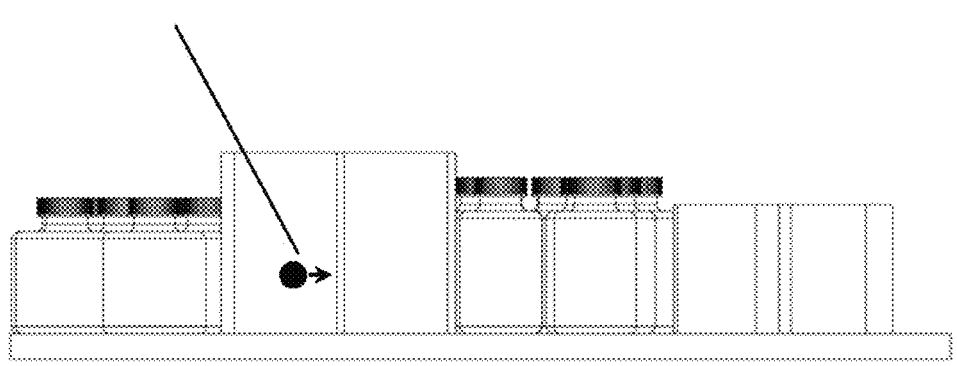

The robotic arm 620 comprising the end effector 670 of the presently disclosed invention may be used to pick pieces with the common variability found in item size, shape, weight and placement within a logistics facility. An exemplary representative drawing of such variability is shown in FIGS. 20A and 20B, which are the top and front views, respectively, of a stocked shelf 500. Common logistics storage infrastructure, such as an ordinary shelf or rack 500, does not constrain any item location and orientation for the purposes of any deliberate accuracy, therefore, in order for a robot to do a pick at random it must have sufficient freedom to grasp an item in various configurations. As such, a high degree-of-freedom robotic arm 620 comprising the adapter 100 and end effector 670 of the presently disclosed invention provides the manipulability necessary to pick an item in any configuration in which it is found.

Figure 19:
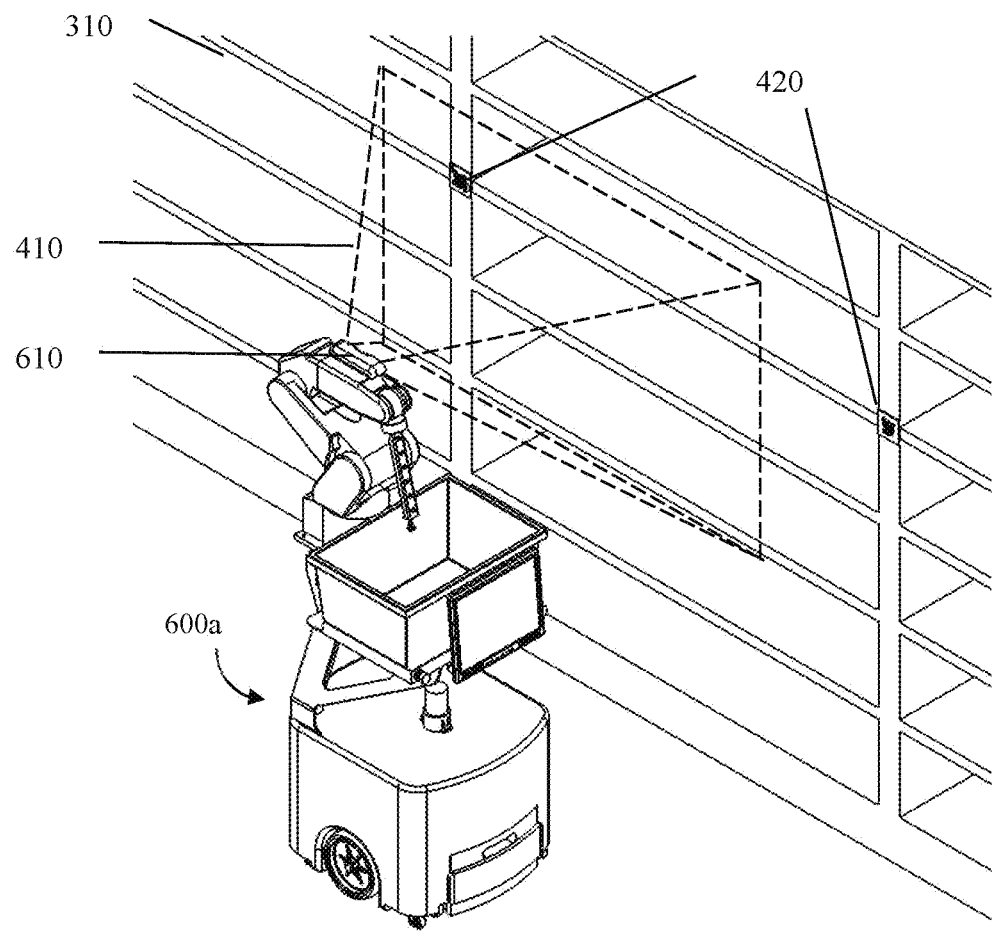
FIG. 19 illustrates a diagram depicting a manipulation robot navigation using visual landmark location markers in accordance with certain aspects of the presently disclosed invention.

With continued reference to FIGS. 20A and 20B, the AMMR 600 may physically adjust for variations in item location and orientation which may be determined from sensor information prior to the pick, such as from sensors 610. The robotic arm 620 may be mounted to the AMMR at a position on top of the mobile base 660, such as shown in FIG. 19 for AMMR 600a. The robotic arm 620 enables the AMMR to reach multiple shelf level heights. The vertical reach of a AMMR may be extended, for example, by mounting the robotic arm 620 on a distal end 642b of vertical actuator stage 642 as shown in FIGS. 1 and 2. The vertical actuator stage would be able to raise and lower the robotic arm 620, such as along vertical tracks 680 in the main body 616 of the AMMR, so an end effector 670 and picker 675 can reach both higher and lower pick locations.

The AMMR 600 may also be equipped with safety features which can include: one or more safety lights or strobes (655), an audible warning annunciator or horn, one or more emergency stop buttons (653), the ability to display fault, error and/or intended action (such as navigation turn signal) information on the user interface 630 or at some other point on the robot, or any combination thereof.

The AMMR 600 may contain an external swappable memory port on a side, where necessary information may be uploaded to the robot directly when the operator inserts a data storage device, thus by-passing the wireless communication to the server. The data storage device may be a disk, USB flash device, or other form of external memory storage device. The data may also be transferred through proximity communication technologies, such as near field communication (NFC), Bluetooth, or short-range radio-frequency identification (RFID) standards.

Furthermore, the AMMR 600 may be configured to receive signals from the central server 200, or directly from the WMS 201, which may indicate an emergency and may direct the robot to stop and/or may further activate the one or more safety lights or strobes and/or audible warning annunciator or horn. In the event that an unstable and/or unsafe diagnostic state for the robot is detected by the one or more robot processors (i.e., 218), the robot may be stopped. The AMMR 600 may also be stopped if the sensors detect a human or obstacle in close proximity or detect unsafe operation of the robot. Such signals may be processes at the central server 200 which may then control the robot speed and or direction of operation.

The AMMR 600 may also send signals back to the central server 200, the WMS 201, or to other robots regarding conditions in a navigation pathway (e.g., obstacles, unsafe conditions), a condition of the robot (e.g., unstable and/or unsafe diagnostic state, load state, status of the work order, battery charge state, collision), or a condition of the inventory or warehouse (e.g., no item at pick location, inventory status).

Figure 18:
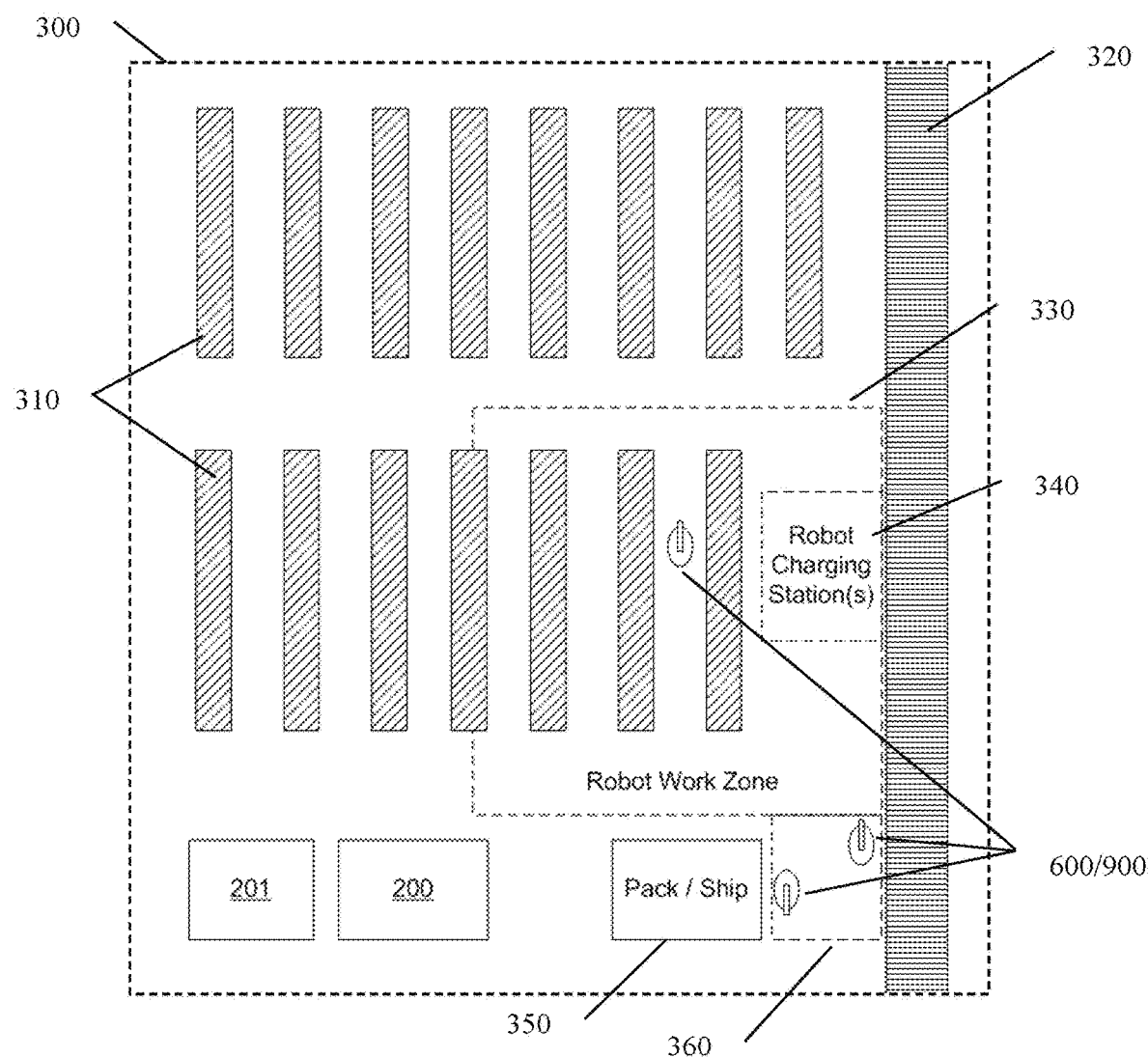
FIG. 18 illustrates a simplified overhead floor plan view of a representative logistics facility in accordance with certain aspects of the presently disclosed invention.
Figure 21:
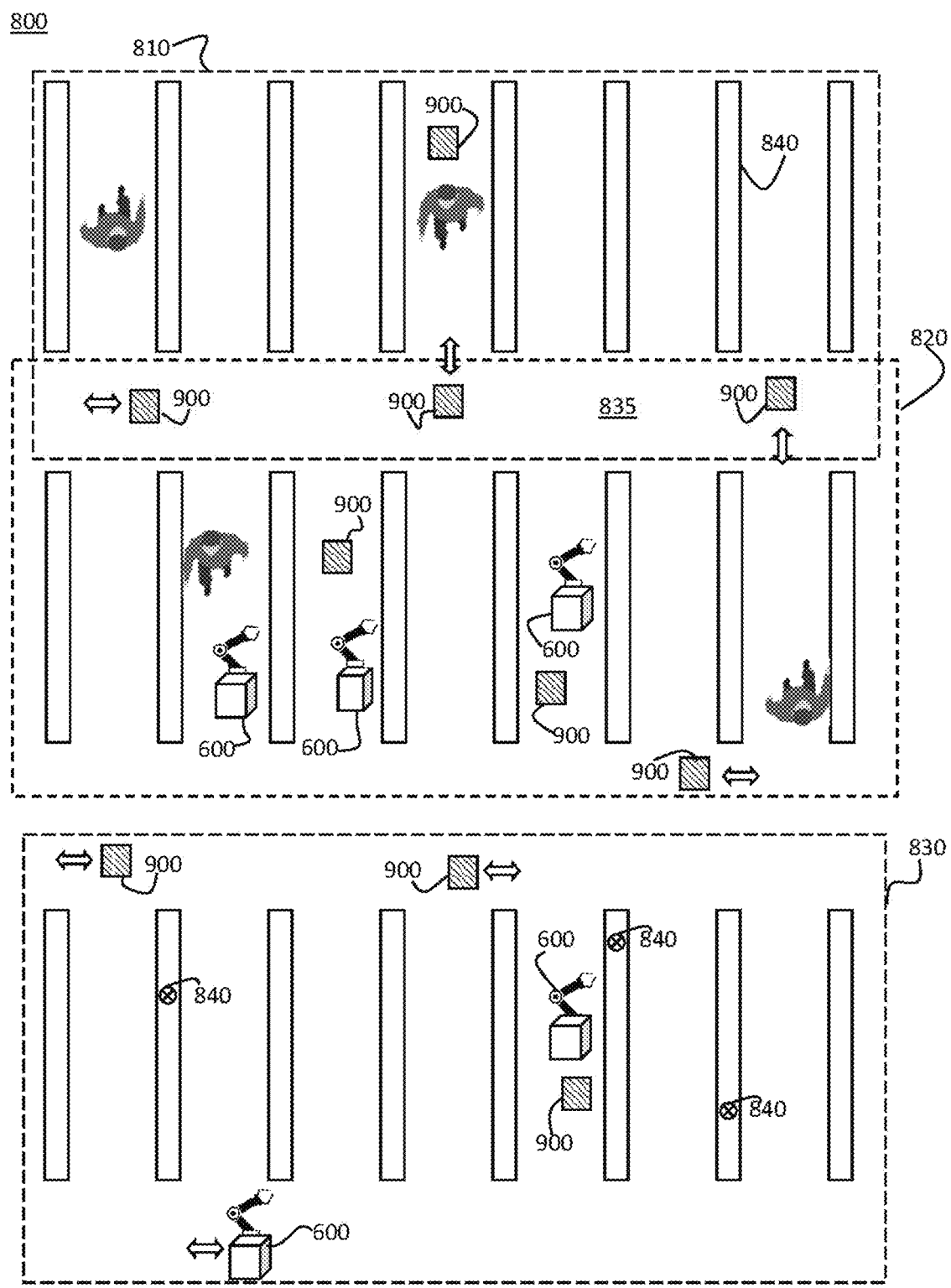
FIG. 21 illustrates a simplified overhead floor plan view of a representative logistics facility in accordance with certain aspects of the presently disclosed invention.

FIGS. 18 and 21 show exemplary top view floor plans of a section of a logistics facility (300 and 800, respectively) in which the AMMR 600 and optional AMR 900 may be deployed. The presently disclosed system(s) and method(s) enable object pieces, totes, or bins to be picked by the AMMR 600 and transferred to any of an AMR 900, a packing and shipping station 350, or a conveyor 320 or a staging area 360.

According to certain aspects of the presently disclosed invention, various work zones may be defined within a logistics facility. For example, and with specific reference to FIG. 21, a logistics facility 800 may include zones that are robot specific work zones where human workers are excluded 830, zones where humans and robots may work side-by-side 820, and human-only work zones where robots are substantially or totally excluded 810. While shown in FIG. 21 to include entire rows of shelving units 840, these zones may be setup in any user defined manner, such that portions of shelving or storage rows or even individual units may include two or more work zones.

Selection of these work zones may be dynamic. That is, the various work zones may be defined/redefined at any point during operation of the system from either the central server 200 or the WMS 201. In certain instances, signals may be communicated to the central server 200 or the WMS 201 regarding a new limitation or definition of the work zones, such as from any of the robots (600, 900). For example, in the case of a human accident or emergency, it may be necessary to exclude robots from a specific area of a logistics facility. Robots in the area may send information regarding the emergency (i.e., emergency signals initiated by the robot or by a human worker, or sensor information that may be interpreted at a distal location to indicate an emergency). Alternatively, in the case of a detected collision, the AMMR may communicate with the central server 200 or the WMS 201 to exclude other robots from the area in the logistics facility until repair are completed. Repairs may be by a human worker, or according to certain aspects of the presently disclosed invention, repairs may be made by the AMMR. For example, the AMMR may be configured to position a detached end effector 670 on the AMMR so that it may be autonomously reattached.

With continued reference to FIGS. 1 and 2, the platform 640 of the AMMR may be configured to sense the weight of the piece placed thereon. This information may be communicated to the central server 200 and may provide additional verification that the correct SKU was picked, and that the item was properly transferred to the platform 640. If the wrong weight is sensed in the platform 640, the end effector 670 and picker 675 may be used to remove the item from the storage bed. The item may be replaced to the storage location by the end effector 670 and picker 675, or a signal may be sent to the central server 200 requesting manual assistance, such as from a human pick worker. In the event that no weight is sensed in the platform 640, the end effector 670 and picker 675 may be used to select another replacement item and/or retrieve the dropped item. Further, a signal may be sent to the central server 200 requesting manual assistance, such as from a human pick worker, or to alert the system to a change in the SKU inventory.

With reference to FIGS. 1A and 1B, the AMMR 600 may have sensors that enable autonomous navigation within a facility. Any of the sensors, such as sensors 610 on the end effector, or sensors on the AMMR, may be 3D or structured light depth cameras, stereo cameras, color cameras, laser ranging devices, or any combination thereof. These sensors may provide high resolution 3D point data to the AMMR that details the presence of physical objects within the sensors field of view. The sensors may be connected to the onboard computer processor 218, which may process the 3D point and color data to extract information for navigation and picking. Moreover, the AMMR may be programmed to point the sensors in a direction that is expected for the task.

In order to perform pick work, the AMMR 600 may move and navigate between pick locations in a work zone 330 and/or an order transfer area 360 (see FIG. 18). During navigation, the sensor data may be processed by the onboard computer processor 218 in a navigation software module 212 to extract local mapping information that indicates which areas around the manipulation robot 100 are traversable and which areas contain obstacles. Ground facing sensors on the AMMR may be used to generate this mapping information and collision detection information. When a front-facing and rear-facing sensor are included on the AMMR, it may be able to navigate while driving both forwards and backwards, which in certain picking scenarios, eliminates the need for the AMMR to turn around, thus reducing travel time and increasing picking efficiency.

The sensor data may be processed by the onboard computer processor 218 in a navigation software module 212 to extract visual or audible landmark locations, such as the visual landmark marker 420 locations shown in FIG. 19. According to the presently disclosed invention, the system may use landmarks such as visual markers 420, which may be placed ahead of time in fixed locations around the facility of operation. At least one of the sensors (610) may be used to detect these markers 420 and locate the AMMR (600*a*) relative to them. This enables the AMMR to know precisely where it is in the facility. Each marker 420 may have a unique pattern that is different from other markers 420 within the same facility. The unique marker pattern 420 may be recognized by navigation module 212 algorithms which may be run by the onboard computer processor 218, thus allowing the AMMR to localize itself without ambiguity.

Exemplary landmarks include visual markers as described above, which may include any identifiable unique visual pattern, such as barcodes, numbers, letters, geometric shapes, or even a specific pattern of blinking lights, and audible markers, which may include at least unique patterns of sound or even specific tones of sound. Before a robot can use landmarks for navigation, the characteristics of the landmarks may be stored on the central server 200 or on the remote storage (216, 976) of the robot (600, 600a, 900). When the characteristics of the landmarks are stored on the remote storage (216, 976) of the robots (600, 900), they may navigate autonomously through a logistics facility and may not require constant communication from the central server 200.

To perform individual piece picks, sensors (610) may be used to detect and localize individual items along with the specific locations and orientations of the grasp points 501 on the surface of a piece. FIGS. 20A and 20B present an exemplary diagram of how the AMMR may use its end effector 670 and picker 675 to grasp a piece at a specific point and orientation 501. During a pick, the sensors 610 also locate the infrastructure around the pieces such as shelving levels 500, rack columns, shelf faces and signage. This geometry information for the infrastructure is required for pick manipulation algorithms in a manipulation software module 214 to determine a pick trajectory that is collision free, such that the AMMR is able to grasp the piece without colliding with surrounding objects.

Special attention has been given to the placement of the picking perception sensors 610, which are mounted on the end effector 670 in an orientation that allows them to see the pick location, as is shown in FIG. 19. This method enables the system to localize additional pick pieces, grasp positions and orientations after a pick has been made and an item is being placed into/onto the platform 640. This picking geometry information can be stored in memory 256, on the central server 200, or, and also, on the local storage 216 where it can be recalled later to enable sufficiently fast picks of the same SKU the next time it is required. Additionally, it is common for more than a single item of a particular SKU to be picked for an order. In this case, the perception and localization computation of additional pick items can be done at the same time the robotic arm 620 is placing a previous pick on the platform 640, which may help to improve the speed and efficiency of picking multiple items which are in near proximity.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A tool changer system for a manipulation robot arm, the system comprising:
 an adapter comprising:
  a pneumatic fitting,
  a top surface configured for connection to an end of a robotic arm, and
  a bottom surface including a port in fluid communication with the pneumatic fitting, an adapter magnetic connector, and an adapter electrical connector; and
 an end effector having a body, the body comprising:
  a distal end including a picker; and
  a proximal end configured for a releasable break-away connection with the bottom surface of the adapter, the connection including a quick disconnect fitting configured for connection with the port of the adapter, an end effector magnetic connector, and an end effector electrical connector,
 wherein the adapter magnetic and electrical connectors are configured for connection with the end effector magnetic and electrical connectors, respectively, to provide the releasable break-away connection between the adapter and the end effector, and
 wherein the top surface of the adapter comprises at least one robotic arm alignment feature and at least one attachment fixture.

2. The system of claim 1, wherein the adapter magnetic connector comprises a ferromagnetic plate and the end effector magnetic connector comprises at least one magnet, or wherein the adapter magnetic connector comprises at least one magnet and the end effector magnetic connector comprises a ferromagnetic plate, or wherein both the adapter magnetic connector and the end effector magnetic connector comprises at least one magnet and a ferromagnetic plate.

3. The system of claim 1, wherein the adapter electrical connector comprises at least one contact pin target and the end effector electrical connector comprises or at least one contact pin, or wherein the adapter electrical connector comprises at least one contact pin and the end effector electrical connector comprises or at least one contact pin target.

4. The system of claim 1, wherein the proximal end of the end effector and the bottom surface of the adapter comprise alignment features that engage upon connection between the end effector and the adapter.

5. The system of claim 1, wherein the end effector further comprises a conduit providing fluid communication between the pneumatic fitting and the picker when the releasable break-away connection between the adapter and the end effector is engaged.

6. The system of claim 1, wherein the end effector comprises an extension tool positioned between the picker and the distal end of the end effector, wherein the extension tool comprises a reduced diameter portion of the end effector at the distal end thereof.

7. The system of claim 6, wherein the reduced diameter portion is offset from a central longitudinal axis of the end effector.

8. The system of claim 1, wherein the at least one robotic arm alignment feature is adapted to engage an aperture at a distal end of a robotic arm, and the at least one attachment fixture provides attachment of the adapter to the distal end of the robotic arm.

9. The system of claim 8, wherein the at least one attachment fixture of the adapter comprises at least one mounting screw.

10. A tool changer system for a manipulation robot arm, the system comprising:
 an adapter comprising:
  a pneumatic fitting,
  a top surface configured for connection to an end of a robotic arm, and a bottom surface including a port in fluid communication with the pneumatic fitting, an adapter magnetic connector, and an adapter electrical connector; and
an end effector having a body, the body comprising:
a distal end including a picker; and
a proximal end configured for a releasable break-away connection with the bottom surface of the adapter, the connection including a quick disconnect fitting configured for connection with the port of the adapter, an end effector magnetic connector, and an end effector electrical connector,
wherein the adapter magnetic and electrical connectors are configured for connection with the end effector magnetic and electrical connectors, respectively, to provide the releasable break-away connection between the adapter and the end effector,
wherein the proximal end of the end effector and the bottom surface of the adapter comprise alignment features that engage upon connection between the end effector and the adapter, and
wherein the alignment features include an alignment ring on the end effector that engages with spring plungers on the adapter.

11. The system of claim 10, wherein the alignment features further include one or more diamond pins on the end effector that engage with aligned slots on the adapter.

12. A tool changer system for a manipulation robot arm, the system comprising:
an adapter comprising:
a pneumatic fitting,
a top surface configured for connection to an end of a robotic arm, and
a bottom surface including a port in fluid communication with the pneumatic fitting, an adapter magnetic connector, and an adapter electrical connector; and
an end effector having a body, the body comprising:
a distal end including a picker; and
a proximal end configured for a releasable break-away connection with the bottom surface of the adapter, the connection including a quick disconnect fitting configured for connection with the port of the adapter, an end effector magnetic connector, and an end effector electrical connector,
wherein the adapter magnetic and electrical connectors are configured for connection with the end effector magnetic and electrical connectors, respectively, to provide the releasable break-away connection between the adapter and the end effector, and
wherein the proximal end of the end effector comprises clocking features that provide initial alignment of the end effector with the bottom surface of the adapter.

13. A tool changer system for a manipulation robot arm, the system comprising:
an adapter comprising:
a pneumatic fitting,
a top surface configured for connection to an end of a robotic arm, and
a bottom surface including a port in fluid communication with the pneumatic fitting, an adapter magnetic connector, and an adapter electrical connector; and
an end effector having a body, the body comprising:
a distal end including a picker; and
a proximal end configured for a releasable break-away connection with the bottom surface of the adapter, the connection including a quick disconnect fitting configured for connection with the port of the adapter, an end effector magnetic connector, and an end effector electrical connector,
wherein the adapter magnetic and electrical connectors are configured for connection with the end effector magnetic and electrical connectors, respectively, to provide the releasable break-away connection between the adapter and the end effector, and
wherein the end effector comprises a first sensor set and a second sensor set, wherein the first and second sensor sets are centrally located on the end effector on opposing sides thereof.

14. The system of claim 13, wherein each of the first and second sensor sets comprise a 3D camera and a light.

15. A tool changer system for a manipulation robot arm, the system comprising:
an adapter comprising:
a pneumatic fitting,
a top surface configured for connection to an end of a robotic arm, and
a bottom surface including a port in fluid communication with the pneumatic fitting, an adapter magnetic connector, and an adapter electrical connector; and
an end effector having a body, the body comprising:
a distal end including a picker; and
a proximal end configured for a releasable break-away connection with the bottom surface of the adapter, the connection including a quick disconnect fitting configured for connection with the port of the adapter, an end effector magnetic connector, and an end effector electrical connector,
wherein the adapter magnetic and electrical connectors are configured for connection with the end effector magnetic and electrical connectors, respectively, to provide the releasable break-away connection between the adapter and the end effector, and
wherein the end effector comprises at least one strain gauge configured to register either or both of a collision and a weight of a picked item.

16. A tool changer system for a manipulation robot arm, the system comprising:
an adapter comprising:
a pneumatic fitting,
a top surface configured for connection to an end of a robotic arm, and
a bottom surface including a port in fluid communication with the pneumatic fitting, an adapter magnetic connector, and an adapter electrical connector; and
an end effector having a body, the body comprising:
a distal end including a picker; and
a proximal end configured for a releasable break-away connection with the bottom surface of the adapter, the connection including a quick disconnect fitting configured for connection with the port of the adapter, an end effector magnetic connector, and an end effector electrical connector,
wherein the adapter magnetic and electrical connectors are configured for connection with the end effector magnetic and electrical connectors, respectively, to provide the releasable break-away connection between the adapter and the end effector, and
wherein the end effector comprises a one-piece chassis having a reduced diameter portion at the distal end thereof, wherein the reduced diameter portion is offset from a central longitudinal axis of the end effector so that the picker attached thereto is offset from the central longitudinal axis of the end effector.

17. A manipulation robot comprising the tool changer system according to claim 1, wherein the top surface of the adapter is attached to a distal end of a robotic arm of the manipulation robot.

18. The manipulation robot of claim 17, wherein the manipulation robot is configured to autonomously exchange a first end effector for a second end effector.

19. A method for accurate order fulfillment comprising:
- picking at least one item or tote from an item storage location within the logistics facility using the end effector of the manipulation robot of claim 17, wherein the manipulation robot can autonomously navigate and position itself within the logistics facility;
- placing the at least one item or tote on a piece containment area of the manipulation robot; and
- transferring, using the end effector, the at least one item or tote from the piece containment area of the manipulation robot to any of an autonomous mobile robot (AMR), a pack and/or ship area, a storage location in a logistics facility, or a human pick worker.

20. A manipulation robot comprising the tool changer system according to claim 10, wherein the top surface of the adapter is attached to a distal end of a robotic arm of the manipulation robot.

21. A method for accurate order fulfillment comprising:
- picking at least one item or tote from an item storage location within the logistics facility using the end effector of the manipulation robot of claim 20, wherein the manipulation robot can autonomously navigate and position itself within the logistics facility;
- placing the at least one item or tote on a piece containment area of the manipulation robot; and
- transferring, using the end effector, the at least one item or tote from the piece containment area of the manipulation robot to any of an autonomous mobile robot (AMR), a pack and/or ship area, a storage location in a logistics facility, or a human pick worker.

22. A manipulation robot comprising the tool changer system according to claim 12, wherein the top surface of the adapter is attached to a distal end of a robotic arm of the manipulation robot.

23. A method for accurate order fulfillment comprising:
- picking at least one item or tote from an item storage location within the logistics facility using the end effector of the manipulation robot of claim 22, wherein the manipulation robot can autonomously navigate and position itself within the logistics facility;
- placing the at least one item or tote on a piece containment area of the manipulation robot; and
- transferring, using the end effector, the at least one item or tote from the piece containment area of the manipulation robot to any of an autonomous mobile robot (AMR), a pack and/or ship area, a storage location in a logistics facility, or a human pick worker.

24. A manipulation robot comprising the tool changer system according to claim 13, wherein the top surface of the adapter is attached to a distal end of a robotic arm of the manipulation robot.

25. A method for accurate order fulfillment comprising:
- picking at least one item or tote from an item storage location within the logistics facility using the end effector of the manipulation robot of claim 24, wherein the manipulation robot can autonomously navigate and position itself within the logistics facility;
- placing the at least one item or tote on a piece containment area of the manipulation robot; and
- transferring, using the end effector, the at least one item or tote from the piece containment area of the manipulation robot to any of an autonomous mobile robot (AMR), a pack and/or ship area, a storage location in a logistics facility, or a human pick worker.

26. A manipulation robot comprising the tool changer system according to claim 15, wherein the top surface of the adapter is attached to a distal end of a robotic arm of the manipulation robot.

27. A method for accurate order fulfillment comprising:
- picking at least one item or tote from an item storage location within the logistics facility using the end effector of the manipulation robot of claim 26, wherein the manipulation robot can autonomously navigate and position itself within the logistics facility;
- placing the at least one item or tote on a piece containment area of the manipulation robot; and
- transferring, using the end effector, the at least one item or tote from the piece containment area of the manipulation robot to any of an autonomous mobile robot (AMR), a pack and/or ship area, a storage location in a logistics facility, or a human pick worker.

28. A manipulation robot comprising the tool changer system according to claim 16, wherein the top surface of the adapter is attached to a distal end of a robotic arm of the manipulation robot.

29. A method for accurate order fulfillment comprising:
- picking at least one item or tote from an item storage location within the logistics facility using the end effector of the manipulation robot of claim 28, wherein the manipulation robot can autonomously navigate and position itself within the logistics facility;
- placing the at least one item or tote on a piece containment area of the manipulation robot; and
- transferring, using the end effector, the at least one item or tote from the piece containment area of the manipulation robot to any of an autonomous mobile robot (AMR), a pack and/or ship area, a storage location in a logistics facility, or a human pick worker.

* * * * *